US010451419B2

(12) United States Patent
Kurashina et al.

(10) Patent No.: US 10,451,419 B2
(45) Date of Patent: Oct. 22, 2019

(54) DETECTION SYSTEM HAVING WHEEL ROTATION SENSORS FOR NAVIGATION

(71) Applicant: Seiko Epson Corporation, Tokyo (JP)

(72) Inventors: Takashi Kurashina, Matsumoto (JP); Katsuhiko Maki, Chino (JP); Hideo Haneda, Matsumoto (JP)

(73) Assignee: Seiko Epson Corporation (JP)

(*) Notice: Subject to any disclaimer, the term of this patent is extended or adjusted under 35 U.S.C. 154(b) by 155 days.

(21) Appl. No.: 15/340,278

(22) Filed: Nov. 1, 2016

(65) Prior Publication Data

US 2017/0122739 A1    May 4, 2017

(30) Foreign Application Priority Data

Nov. 2, 2015  (JP) ................................. 2015-215504

(51) Int. Cl.
*G01C 19/5776* (2012.01)
*G01C 21/12* (2006.01)
(Continued)

(52) U.S. Cl.
CPC ......... *G01C 19/5776* (2013.01); *G01C 21/12* (2013.01); *G01C 21/16* (2013.01); *G01C 21/206* (2013.01)

(58) Field of Classification Search
CPC ...... G01C 21/12; G01C 21/16; G01C 21/165; G01C 21/18; G01C 21/206;
(Continued)

(56) References Cited

U.S. PATENT DOCUMENTS 4,698,775 A * 10/1987 Koch ..................... B25J 5/007
                                                 414/265
5,801,301 A *  9/1998 Jeong ...................... B60T 8/00
                                                 340/463
(Continued)

FOREIGN PATENT DOCUMENTS

JP    11-271042 A    10/1999
JP    2004-110805 A   4/2004
(Continued)

OTHER PUBLICATIONS

Gersdorf et al, A Kalman Filter for Odometry using a Wheel Mounted Inertial Sensor, ICINCO 2013—10th International Conference on Informatics in Control, Automation and Robotics.*
(Continued)

*Primary Examiner* — Justin Seo
*Assistant Examiner* — David L Singer
(74) *Attorney, Agent, or Firm* — Harness, Dickey & Pierce, P.L.C.

(57) ABSTRACT

A detection apparatus includes a first sensor for detecting rotation information of a wheel of a moving object; a second sensor for detecting angular velocity information of a rotation in a yaw axis of the wheel or angular information as yaw rotation information; and a storage unit for storing the rotation information and the yaw rotation information to be output to a processing unit for obtaining positional information of the moving object based on the rotation information and the yaw rotation information.

17 Claims, 14 Drawing Sheets

(51) Int. Cl.
*G01C 21/16* (2006.01)
*G01C 21/20* (2006.01)

(58) Field of Classification Search
CPC ............ G01C 19/5614; G01C 19/5776; G01C 25/005; B62B 3/1408
USPC ......... 73/510, 504.12; 701/504.12, 494, 498, 701/499, 504
See application file for complete search history.

(56) References Cited

U.S. PATENT DOCUMENTS

| | | | | |
|---|---|---|---|---|
| 5,916,285 | A * | 6/1999 | Alofs | G05D 1/027 701/23 |
| 9,081,109 | B1 * | 7/2015 | Olsson | G01V 3/08 |
| 2003/0102969 | A1 * | 6/2003 | Parsons | B62B 3/1404 340/539.13 |
| 2003/0216865 | A1 * | 11/2003 | Riewe | G01C 21/165 701/470 |
| 2004/0221790 | A1 * | 11/2004 | Sinclair | G01C 22/02 116/62.1 |
| 2005/0029764 | A1 | 2/2005 | Tanaka | |
| 2006/0247847 | A1 * | 11/2006 | Carter | A47F 10/04 701/498 |
| 2006/0249320 | A1 * | 11/2006 | Carter | A47F 10/04 180/65.51 |
| 2007/0260397 | A1 * | 11/2007 | Kurata | G01C 21/28 701/489 |
| 2008/0074260 | A1 * | 3/2008 | Reiner | B60R 25/09 340/568.5 |
| 2008/0231432 | A1 * | 9/2008 | Stawar | B62B 3/1408 340/425.5 |
| 2008/0262730 | A1 * | 10/2008 | Onome | G01C 21/28 701/500 |
| 2008/0314667 | A1 * | 12/2008 | Hannah | A47F 10/04 180/197 |
| 2010/0326189 | A1 * | 12/2010 | Sato | G01C 19/56 73/504.12 |
| 2012/0055230 | A1 * | 3/2012 | Naruse | G01C 19/5726 73/1.37 |
| 2012/0158297 | A1 * | 6/2012 | Kim | G01C 21/206 701/516 |
| 2012/0183016 | A1 * | 7/2012 | Kanai | G01K 7/01 374/163 |
| 2013/0166193 | A1 * | 6/2013 | Goldman | G01C 21/206 701/410 |
| 2013/0261964 | A1 * | 10/2013 | Goldman | G01C 21/12 701/500 |
| 2014/0305206 | A1 * | 10/2014 | Maki | G01C 19/5776 73/504.12 |
| 2014/0343846 | A1 * | 11/2014 | Goldman | G05D 1/0272 701/525 |
| 2015/0142362 | A1 | 5/2015 | Jordan et al. | |
| 2016/0121889 | A1 * | 5/2016 | Shimomura | B60W 50/14 701/41 |

FOREIGN PATENT DOCUMENTS

| | | |
|---|---|---|
| JP | 2005-030779 A | 2/2005 |
| JP | 2006-349399 A | 12/2006 |
| JP | 2007-058492 A | 3/2007 |
| JP | 2007-058758 A | 3/2007 |
| JP | 2010-127919 A | 6/2010 |
| JP | 2010-247303 A | 11/2010 |
| JP | 2012-215547 A | 11/2012 |
| WO | WO-2015-073825 A1 | 5/2015 |

OTHER PUBLICATIONS

Teacher Mechanics, Wheels Diameter/Distance Traveled, 2005, Robomatter Inc.*
West, Dynamics Rolling Motion, Oct. 17, 2015, Illinois College of Engineering.*
Normani, Rotational Motion, Dec. 22, 2010, Real-World-Physics-Problems.com.*
Garcia-Saura, Self-calibration of a differential wheeled robot using only a gyroscope and a distance sensor, Sep. 2015, Imperial College London Department of Computing.*
Sparkfun, Gyroscope (Year: 2013).*
Seiko Espon, Gyro sensors—How they work and what's ahead (Year: 2015).*
Hiremath et al, Development and evaluation of a gyroscope-based wheel rotation monitor for manual wheelchair users, The Journal of Spinal Cord Medicine 2013 vol. 36 No. 4 (Year: 2013).*
Piyabongkarn et al, The Development of a MEMS Gyroscope for Absolute Angle Measurement, IEEE Transactions on Control Systems Technology, vol. 13, No. 2, Mar. 2005 (Year: 2005).*

* cited by examiner

DETECTION SYSTEM HAVING WHEEL ROTATION SENSORS FOR NAVIGATION

BACKGROUND

1. Technical Field

The present invention relates to a detection apparatus, a detection system, and a moving object.

2. Related Art

As a method for estimating a self position of a moving object in a case where positional information cannot be obtained from outside of the moving object by a GPS or the like, a method called dead reckoning or odometry is known. In these methods, the self position of the moving object is estimated based on the outputs from various sensors provided in the moving object.

For example, JP-A-2006-349399 discloses an azimuth measuring device for detecting a rotational angular velocity of the rotation about a vertical axis of a moving object and a rotational velocity of a drive wheel, and selecting any one of the rotational angular velocity rotating about the vertical axis of the detected moving object and the rotational angular velocity rotating about the vertical axis of the moving object to be estimated from the rotational velocity of the drive wheel according to driving force to be applied to the drive wheel.

Alternatively, JP-A-2007-58758 discloses a customer moving path information collection device for capturing a floor surface image by an imaging unit which is attached to a shopping cart and detecting a traveling state and a traveling velocity of the shopping cart from the floor image.

In such a self position estimation, there is a problem that there is a case where the self position of the moving object cannot be always accurately estimated depending on a point where the sensor is arranged on the moving object. For example, in an automobile or the like, a self position is generally estimated by a vehicle velocity pulse of a gyro sensor output and a gyro sensor output of a vehicle body. However, even when an estimation method is applied to a shopping cart, the self position cannot be accurately estimated. In the shopping cart or the like, the wheel is attached so as to freely rotate with respect to the main body of the moving object by a so-called caster. Accordingly, since there is no correlation between the movement direction and the direction of the main body (for example, the shopping cart can be moved to the side or back with the front of the shopping cart facing forward), the self position cannot be recognized through the vehicle velocity pulse and the gyro sensor output of the vehicle body.

In addition, in the method as in JP-A-2007-58758, since a displacement of an imaging unit or an image process of a floor surface image is required, there is a problem that the size of the device is increased or a process is complicated.

SUMMARY

An advantage of some aspects of the invention is to provide a detection apparatus, a detection system, and a moving object which are capable of estimating a self position of the moving object more accurately using a sensor which is provided in a wheel.

The invention can be implemented as the following forms or application examples.

An aspect of the invention relates to a detection apparatus including: a first sensor for detecting rotation information of a wheel of a moving object; a second sensor for detecting angular velocity information of rotating about a yaw axis of the wheel or angular information as yaw rotation information; and a storage unit for storing the rotation information and the yaw rotation information to be output in a processing unit for obtaining positional information of the moving object based on the rotation information and the yaw rotation information.

According to the aspect of the invention, the rotation information of the wheel is detected by the first sensor, and the yaw rotation information of the wheel is detected by the second sensor. The detected rotation information of the wheel and the yaw rotation information are output in the processing unit, and the positional information of the moving object is acquired by the processing unit. Therefore, the self position of the moving object can be accurately estimated by the sensor provided in the wheel.

In the aspect of the invention, the first sensor may be provided in the wheel, and the second sensor may be provided in a member which rotates about a rotating axis parallel to the yaw axis along with the wheel.

Since the wheel is in contact with a surface on which the moving object is traveling, the direction or the rotation of the wheel accurately reflects the movement direction or the movement velocity of the moving object. Therefore, the first sensor is provided in the wheel and the second sensor is provided in the member rotating about the rotating axis parallel to the yaw axis along with the wheel. Accordingly, it is possible to accurately estimate the self position.

In the aspect of the invention, the first sensor and the second sensor may include a gyro sensor.

By using the gyro sensor, a compact detection apparatus which is capable of being attached to the wheel or the like, a self position estimation with high accuracy, and a self position estimation with a small processing load can be implemented.

In the aspect of the invention, the wheel may be rotated by 360 degrees about the rotating axis parallel to the yaw axis.

In a case where the wheel with respect to the main body of the moving object is freely rotated about the rotating axis parallel to the yaw axis, there is no correlation between the movement direction of the moving object and the direction of the main body. Therefore, even when the sensor such as the gyro sensor is attached to the main body, the self position cannot be accurately estimated. From this view point, according to the aspect of the invention, the first sensor detects the rotation information of the wheel and the second sensor detects the yaw rotation information of the wheel, whereby the self position of the moving object can be accurately estimated.

In the aspect of the invention, the moving object may be a non-self-running-moving object.

In a non-self-running-moving object, by performing the self position estimation, it is possible to provide various information items with respect to a user. For example, in a store or a factory, a library, an archive, or the like, by acquiring path information of a cart or a wagon, information such as a path of a customer or the user, a stopping location, or a transit time, and information which is obtained by analyzing these information items can be obtained.

Another aspect of the invention relates to a detection apparatus including: a first sensor for detecting rotation information of a wheel of a moving object; a second sensor for detecting angular velocity information of rotating about a yaw axis of the wheel or angular information as yaw rotation information; and a communication unit for transmitting the rotation information and the yaw rotation information to a processing unit for obtaining positional information of the moving object based on the rotation information and the yaw rotation information.

According to the another aspect of the invention, the rotation information of the wheel is detected by the first sensor and the yaw rotation information of the wheel is detected by the second sensor. The detected rotation information and the yaw rotation information of the wheel are transmitted to the processing unit, and the positional information of the moving object is acquired by the processing unit. Therefore, it is possible to accurately estimate the self position of the moving object by the sensors provided in the wheel.

Still another aspect of the invention relates to a detection system including: a first sensor for detecting rotation information of a wheel of a moving object; a second sensor for detecting angular velocity information of rotating about a yaw axis of the wheel or angular information as yaw rotation information; and a processing unit for performing an estimation process of positional information of the moving object based on the rotation information and the yaw rotation information of the wheel.

According to the still another aspect of the invention, the rotation information of the wheel is detected by the first sensor, and the yaw rotation information of the wheel is detected by the second sensor. Accordingly, the positional information of the moving object is acquired by the processing unit based on the detected rotation information and the yaw rotation information of the wheel. Accordingly, it is possible to accurately estimate the self position of the moving object by the sensors provided in the wheel.

In the still another aspect of the invention, the first sensor may be a sensor for detecting angular velocity information of the rotation of the wheel or angular information as the rotation information, and in the estimation process, the processing unit obtains a moving distance of the wheel based on angular information which is obtained by integrating the angular velocity information items of the rotation information or the angular information of the rotation information, and obtains a moving direction at each moving distance of the wheel based on angular information which is obtained by integrating the angular velocity information items of the yaw rotation information or the angular information of the yaw rotation information to estimate the position of the moving object from the moving distance and the moving direction.

By performing such an estimation process, the self position of the moving object can be estimated based on the rotation information of the wheel detected by the first sensor and the yaw rotation information of the wheel detected by the second sensor. In addition, by performing such a simple process, a self position estimation with low processing load can be implemented.

In the still another aspect of the invention, the first sensor may be a sensor for detecting angular velocity information of a rotation of the wheel or angular information as the rotation information, and in a case where the moving object is moved from a first position to a second position, the processing unit may obtain a correction value that is at least one of a zero point correction value and a sensitivity correction value in the estimation process based on a difference between the positional information of the second position which is estimated based on the rotation information and the yaw rotation information and predetermined positional information corresponding to the second position.

In this manner, the correction value can be obtained based on an error (difference) between the estimated positional information and the positional information to be originally obtained (predetermined positional information).

In the still another aspect of the invention, the processing unit may acquire path information that is a plurality of positional information items along a path from the first position to the second position, and obtain the correction value based on the path information to correct the path information based on the correction value.

According to this, the path information from the first position to the second position is obtained once, the correction value is obtained using the path information, and the path information is corrected ex post facto using the correction value. Therefore, more accurate path information can be obtained.

In the still another aspect of the invention, a storage unit for storing the correction value is further included, and the processing unit may perform the estimation process of the positional information based on the correction value stored in the storage unit.

In this manner, for example, in initialization work or the like before starting a use of the moving object, the path information from the first position to the second position is obtained, the correction value is obtained using the path information, and the correction value is stored in the storage unit. In a case of using the moving object thereafter, the positional information is acquired based on the correction value which is stored in the storage unit. Therefore, more accurate positional information can be acquired.

In the still another aspect of the invention, in a case where it is determined that the moving object has moved in a predetermined region based on the positional information, the processing unit may perform a process for presenting information relating to the predetermined region.

According to this, information relating to the predetermined region is presented to the user of the moving object based on the positional information. Therefore, it is possible to provide various information items relating to the movement path according to the movement path of the user, whereby the convenience is improved.

In the still another aspect of the invention, in a case where it is determined that the predetermined number or more of moving objects are present in the predetermined region among a plurality of the moving objects each including the first sensor and the second sensor, the processing unit may perform a notification process.

According to this, with respect to a user who operates a plurality of moving objects, whether the predetermined number or more of the moving object are present in the predetermined region is notified based on the positional information. Therefore, the various information items can be provided in accordance with the positions of the plurality of moving objects, whereby the convenience is improved.

Yet another aspect of the invention relates to a moving object including the detection apparatus according to any one of the aspects described above.

Still yet another aspect of the invention relates to a moving object including a detection system according to any one of the aspects described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment of the invention will be described below in detail. The embodiment of the invention described below does not improperly limit the contents of the invention described in the appended claims, and it is not always true that all of configurations described in the embodiment are essential as solving means of the invention.

1. Detection Apparatus and Detection System

Figure 1:
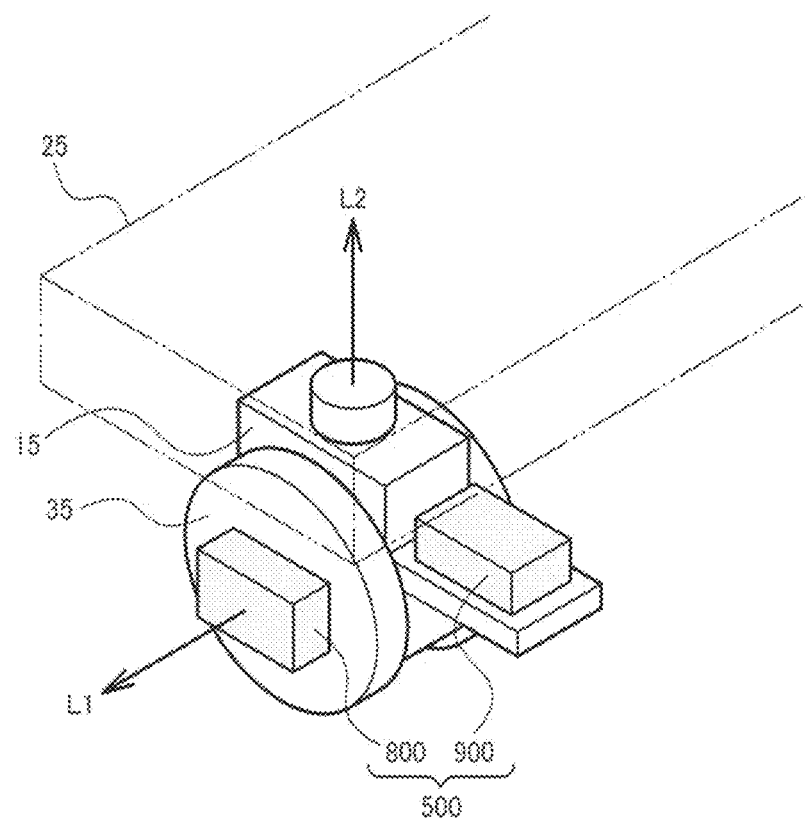
FIG. 1 illustrates a configuration example of a detection apparatus.
Figure 2:
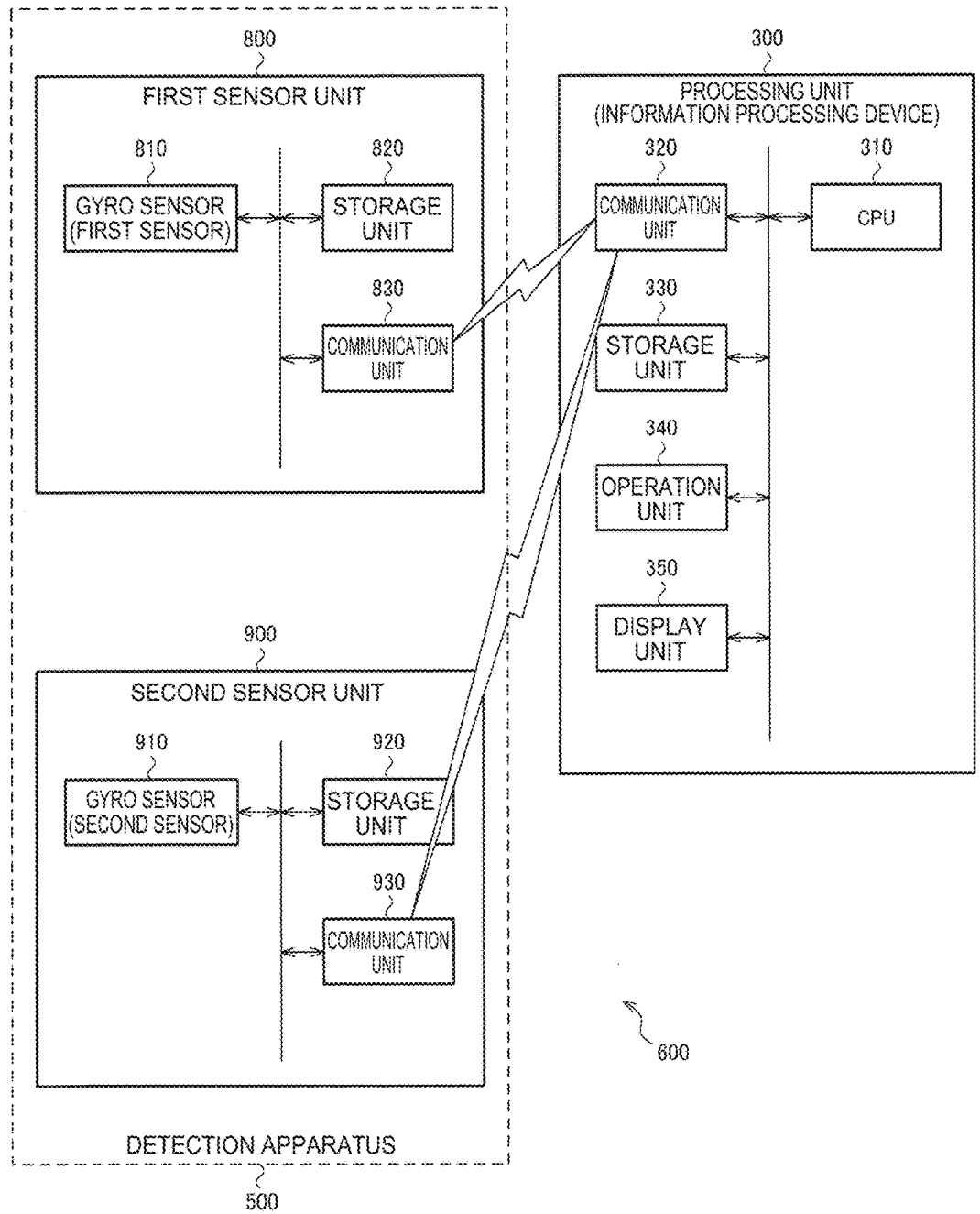
FIG. 2 illustrates configurations of the detection apparatus and a detection system.

FIG. 1 illustrates a configuration example of a detection apparatus 500 according to the present embodiment. FIG. 2 illustrates configurations of the detection apparatus 500 and a detection system 600. The detection system 600 includes the detection apparatus 500 and a processing unit 300. The detection apparatus 500 includes a first sensor unit 800 and a second sensor unit 900. The first sensor unit 800 includes a gyro sensor 810 (first sensor), a storage unit 820, and a communication unit 830. The second sensor unit 900 includes a gyro sensor 910 (second sensor), a storage unit 920, and a communication unit 930. The processing unit 300 includes a CPU 310, a communication unit 320, a storage unit 330, an operation unit 340, and a display unit 350.

The first sensor unit 800 is provided in the wheel 35 of the moving object and is rotated along with the rotation of the wheel 35. As the moving object, a non-self-running (external power of human beings or the like is used as the power) moving object such as a shopping cart to be used in a store of a retailing store or a wagon to be used in a warehouse or a factory can be assumed. The detecting axis of the gyro sensor 810 is parallel to a rotation axis L1 of the wheel 35 and the gyro sensor 810 detects the rotational angular velocity of the wheel 35 of the rotation of the rotation axis L1. Alternatively, the gyro sensor 810 outputs a rotational angle which is obtained by integrating the rotational angular velocities. The detected rotational angular velocity or the rotational angle (rotation information of the wheel 35) is stored in the storage unit 820. The communication unit 830 transmits the rotational angular velocity or the rotational angle which is stored in the storage unit 820 to the communication unit 320 of the processing unit 300.

Since it is sufficient that the gyro sensor 810 can detect the angular velocity of the rotation of the rotation axis L1, the detection axis may not be parallel to the rotation axis L1. An angle formed by the detection axis and the rotation axis L1 may be smaller than 90 degrees. The angle is preferably within 10 degrees, and more preferably 0 degree.

The second sensor unit 900 is provided on a caster unit 15 (in the broad sense, a connecting member) for connecting a main body 25 of the moving object and the wheel 35 and is rotated along with the rotation of the caster unit 15 with respect to the main body 25 (that is, the rotation of the wheel 35 with respect to the main body 25). The caster unit 15 can be rotated in a clockwise direction and a counterclockwise direction freely around a rotating axis L2 (360 degrees). In the normal travelling state (use state) of the moving object, the rotating axis L2 is an axis of a yaw axis (axis along direction perpendicular to the surface on which the moving object is travelling). In addition, the rotating axis L2 is an axis orthogonal (in the broad sense, intersect) to the rotation axis L1. The detection axis of the gyro sensor 910 is parallel to the rotating axis L2 of the caster unit 15. The gyro sensor 910 detects a rotating angular velocity of the caster unit 15 rotating around the rotating axis L2. Alternatively, the gyro sensor 910 outputs a rotating angle which is obtained by integrating the rotating angular velocities. The detected rotating angular velocity or the rotating angle (the yaw rotation information of the wheel 35) is stored in the storage unit 920. The communication unit 930 transmits the rotating angular velocity or the rotating angle stored in the storage unit 920 to the communication unit 320 of the processing unit 300.

Since it is sufficient that the gyro sensor 910 can detect the angular velocity of the rotation of the rotating axis L2, the detection axis may not be parallel to the rotating axis L2. An angle formed by the detection axis and the rotating axis L2 may be smaller than 90 degrees. The angle is preferably within 10 degrees, and more preferably 0 degree.

Alternatively, the processing unit 300 includes, for example, an information processing device such as a personal computer (PC) or a server device, or a mobile information terminal, a dedicated arithmetic device, or the like. The processing unit 300 may be mounted on the moving object and disposed in the difference position from the moving object.

The communication unit 320 receives the rotational angular velocity or the rotational angle of the wheel 35 from the first sensor unit 800 and the rotating angular velocity or the rotating angle of the caster unit 15 from the second sensor unit 900. These information items are stored in the storage unit 330. The CPU 310 (in the broad sense, a processor and a processing device) estimates the position or the movement path of the moving object based on the rotational angular velocity or the rotational angle of the wheel 35 and the rotating angular velocity or the rotating angle of the caster unit 15 and stores the positional information or the path information in the storage unit 330.

In a case where processing unit 300 receives the rotational angular velocity of the wheel 35, the CPU 310 integrates the rotational angular velocities to switch to the rotational angle. In a case where the processing unit 300 receives the rotational angle of the wheel, the CPU 310 uses the rotational angle. The CPU 310 converts the rotational angle to the movement distance of the wheel 35. For example, in a case where the rotational angle is the rotation number of the wheel 35 (which is obtained by dividing the angle by 360 degrees (or 2 π)), the movement distance is obtained by multiplying the circumference of the wheel 35 to the rotation number.

In addition, in a case where processing unit 300 receives the rotating angular velocity of the caster unit 15, the CPU 310 integrates the rotating angular velocity to convert to the rotating angle. In a case where the processing unit 300 receives the rotating angle of the caster unit 15, the CPU 310 uses the rotating angle. For example, the rotating angle is a relative angle which uses an initial angle of the caster unit 15 as a reference. The CPU 310 uses the rotating angle as the direction (direction of the wheel 35 and the movement direction of the wheel 35) of the caster unit 15.

The CPU 310 obtains the positional information from the movement distance of the wheel 35 and the direction of the caster unit 15. For example, the direction and the movement distance is obtained in each discrete time. The positional information is relative information with respect to the initial position, a next position of the initial position is obtained from the direction and the movement distance obtained at the initial time after starting the movement from the initial position, and the positional information at each time is obtained by sequentially repeating that at each time. In a series of the movement path, the positional information at each time is stored in the storage unit 330 as the path information.

The operation unit 340 performs an operation input with respect to the processing unit 300 by the user. For example, the operation unit 340 can use various operation devices such as a button or a touch panel, a mouse, or a key board.

The display unit 350 displays a processing result or the like by the CPU 310 and for example, is configured by a liquid crystal display device. For example, in a case where the positional information of the moving object is acquired in a real time, the information in accordance with the position may be provided to the user by displaying the information.

As the storage units 820 and 920, for example, a volatile memory such as a SRAM or a DRAM, a non-volatile memory such as an EEPROM, a register (for example, may be a register included in a integrated circuit device in the gyro sensor 810), or the like can be assumed. As the storage unit 330, for example, a semiconductor memory such as a volatile memory or a non-volatile memory, a register, a magnetic storage device such as a hard disk drive can be assumed.

The communication between the communication units 830 and 930 and the communication unit 320 may be a wireless communication (for example, a wireless LAN or a near field communication, a mobile communication, or the like), and may be a combination of a wireless communication and the wire communication (for example, a USB or a wire LAN, or the like). For example, the communication units 830 and 930 are connected to a communication network (for example, the Internet communication network) through a wireless router, and the communication network and the communication unit 320 may be connected to each other in the wire manner. The communication units 830 and 930 are connected to the communication unit 320 in the wire manner. However, when considering that the caster unit 15 is freely rotated, the wire connection is preferable. In a case where the processing unit 300 is disposed in the location different from the moving object, it can be assumed that the processing unit 300 performs a process of the path information items of a plurality of moving objects. In this case, the processing unit 300 performs a communication between the plurality of detection apparatuses 500.

As described above, the detection apparatus 500 of the present embodiment includes a first sensor for detecting the rotating information of the wheel 35 of the moving object, a second sensor for detecting angular velocity information of the rotating about the yaw axis of the wheel 35 or angular information as the yaw rotation information, storage units 820 and 920 for storing the rotation information and the yaw rotation information. The rotation information and the yaw rotation information to be stored in the storage units 820 and 920 are output to the processing unit 300. The processing unit 300 obtains the positional information of the moving object based on the rotation information and the yaw rotation information.

As described above, in a case where there is no correlation between the movement direction of the moving object and the direction of the main body 25 by the caster unit 15 or the like freely rotating with respect to the main body 25, the self position cannot be estimated even when attaching the gyro sensor to the main body 25. In this point, according to the present embodiment, the rotation information of the wheel 35 is detected by the first sensor and the yaw rotation information of the wheel 35 is detected by the second sensor. The positional information of the moving object is acquired based on the rotation information and the yaw rotation information of the wheel 35. Therefore, in any way the wheel 35 is attached to the main body 25, the accurate self position can be estimated from the rotation information and the yaw rotation information of the wheel 35.

In the embodiment of FIGS. 1 and 2, the first sensor corresponds to the gyro sensor 810 and the rotation information corresponds to information indicating the rotational angular velocity or the rotational angle which uses the wheel of the wheel axis 35 as the rotation axis L1. The first sensor is not limited to the gyro sensor 810, for example, may use a rotary encoder or a vehicle velocity sensor (a sensor for output a vehicle velocity pulse). The second sensor corresponds to the gyro sensor 910 and the angular velocity information about the yaw axis corresponds to the information of the rotating angular velocity or the rotating angle of the caster unit 15.

The rotational angular velocity and the rotating angular velocity are expressed by, for example, degree per second (dps) and a digital code corresponding to the value is information indicating the rotational angular velocity and the rotating angular velocity. The rotational angle and the rotating angle are expressed by, for example, an angle or a radian, and the rotation number (which is obtained by dividing the angle by 360 degrees and which is obtained by dividing the radian by 2 π) and the digital code corresponding to the value is information indicating the rotational angle and the rotating, angle.

The yaw axis is an axis along a direction perpendicular to a surface where the moving object is travelling. For example, in a case where the moving object is traveling the floor surface, the yaw axis corresponds to an axis along the vertical direction. Alternatively, in a case where the moving object is traveling a wall surface, the yaw axis corresponds to an axis along a direction perpendicular to the wall surface.

Here, in the above-described embodiment, the non-self-running-moving object is assumed, however, the self position estimation method of the present embodiment can also be operated in a self position estimation or an autonomous navigation in the self-running-moving moving object. In addition, in the above-described embodiment, it is assumed a case where the main body 25 is connected to the wheel 35 through the caster unit 15. However, the self position estimation method of the present embodiment can be also operated, for example, in a case where the wheel is rotated with respect to the vehicle body (main body) in the predetermined angle range such as a vehicle.

In addition, in the present embodiment, the first sensor is provided in the wheel 35 and the second sensor is provided in the member rotating about the rotating axis L2 as the yaw axis along with the wheel 35. In particular, the second sensor is provided in the caster unit 15 (in the broad sense, a member connecting the main body 25 and the wheel 35).

Since the wheel 35 is in contact with the surface (floor surface or the like) where the moving object is travelling, the direction or the rotation of the wheel 35 accurately reflects the movement direction of the movement velocity of the moving object. Therefore, by providing the sensor to the wheel 35 and the caster unit 15 as described in the present embodiment, the rotation information and the yaw rotation information of the wheel 35 is detected, and the accurate self position estimation can be performed from these information items.

In addition, in the present embodiment, the first sensor and the second sensor include the gyro sensor. As the gyro sensor, for example, a vibrating gyro sensor using a crystal oscillator, a vibrating gyro sensor using MEMS, or the like can be used.

The output of the gyro sensor is an angular velocity or an angle. Theses outputs can be converted to the distance or the direction with a simple operation. In addition, the gyro sensor obtains a relatively stable signal in comparison with an acceleration sensor. Even when the signal is used to the wheel vibrating due to the irregularity of the floor surface, a measurement with high accuracy can be performed. In addition, a compact gyro sensor such as the above-described vibrating gyro sensor is in practical use. Therefore, by using the gyro sensor, the compact detection apparatus 500 which is capable of being attached to the wheel 35 or the caster unit 15, the detection apparatus 500 which is capable of self position estimation with high accuracy, and the detection system 600 in which the processing load of the self position estimation is small can be implemented.

In addition, in the present embodiment, the wheel 35 can be rotated by 360 degrees about the rotating axis L2 as the yaw axis.

In such a case, there are problems as described above. However, by detecting the rotation information and the yaw rotation information of the wheel 35 by the present embodiment, the positional information of the moving object can be accurately estimated.

In addition, in the present embodiment, the moving object is a non-self-running-moving object. The non-self-running-moving object is not operated by driving the wheel 35 by the moving object, and is a system in which the moving object is travelling by adding power to the moving object by a human being, for example, from the outside of the moving object.

In the self-running-moving object, odometry or dead reckoning is used in the autonomous navigation often. On the other hand, in the non-self-running-moving object, the autonomous navigation is not performed. However, by performing the self position estimation, it is possible to provide various information items to the user. For example, in a store or a factory, a library, an archive, or the like, it is assumed that a cart or wagon is used. However, by acquiring path information of the cart or wagon, a path of a customer or the user, a stopping location, a transit time or the like can be known. For example, in the store, the bought products can be recognized by point of sale (POS) data by combining the path information items. The product which is not actually bought by the customer and reviewed by a customer stopped can be recognized. Alternatively, in the factory, work efficiency can be analyzed using the path information. In addition, in a case where the path information is acquired during traveling at the real time, for example, the information such as a product of the store or a work at the factory, a book stock of the library, a book of the archive can be provided to the customer or the user according to the estimated positional information.

The detection apparatus 500 may be the following configuration. That is, the detection apparatus 500 may include the first sensor, the second sensor, and the communication units 830 and 230 for transmitting the rotation information and the yaw rotation information of the wheel 35 to the processing unit 300.

In this case, the communication units 830 and 930 may transmit the information which is stored in once in the storage units 820 and 920 to the processing unit 300. Alternatively, the communication units 830 and 930 may acquire the information from the first sensor and the second sensor (without passing through the storage units 820 and 920) to transmit the information to the processing unit 300.

Even in such a configuration, the positional information of the moving object can be acquired based on the rotation information and the yaw rotation information of the wheel 35 and the accurate self position can be estimated.

As described above, the detection system 600 of the present embodiment includes the first sensor, the second sensor, and the processing unit 300 for performing an estimation process of the positional information of the moving object based on the rotation information and the yaw rotation information of the wheel 35.

According to the present embodiment, the positional information of the moving object is estimated by the processing unit 300 based on the rotation information and the yaw rotation information of the wheel 35 detected by the first sensor and the second sensor. By constituting such a detection system, the accurate self position estimation can be implemented.

As described above, the processing unit 300 may be provided in the moving object and may be proved outside the moving object. For example, in a case where it is desired to provide the information to the user pressing the cart or the wagon, the processing unit 300 may be provided in the moving object and may display the information to the external device such as a mobile information terminal. Alternatively, in a case where it is desired to analyze purchase information from the path information of the cart, the processing unit 300 may be configured differently from the moving object.

In addition, in the present embodiment, the first sensor (gyro sensor 810) is a sensor for detecting an angular velocity information of the rotation of the wheel 35 (information of the rotational angular velocity) or the angular information (information of the rotational angle) as rotation information. In the estimation process of the positional information, the processing unit 300 obtains the movement distance of the wheel 35 based on the angular information which is obtained by integrating the angular velocity information items of the rotation information or the angular information of the rotation information. In addition, the processing unit 300 obtains the movement direction between the movement distances of the wheel 35 based on the angular information which is obtained by integrating the angular velocity information items of the yaw rotation information or the angular information of the yaw rotation information. The processing unit 300 estimates the position of the moving object from the movement distance and the movement direction.

By performing such an estimation processing, the self position of the moving object can be estimated based on the rotation information of the wheel 35 detected by the first sensor and the yaw rotation information of the wheel 35 detected by the second sensor. By performing a simple process such as an integration process of the angular velocity information, a process converting the angular information to the movement distance, or a process converting the angular information to the movement direction (alternatively, the angular information is used as information of the movement direction without any change), the accurate self position estimation with low process load can be implemented.

In addition, in the present embodiment, in a case where the moving object is moved from the first position to the second position, the processing unit 300 obtains the correction value that is at least one of a zero point correction value and a sensitivity correction value in the estimation process based on the difference between the positional information at the second position which is estimated based on the rotation information and the yaw rotation information of the wheel 35 and the predetermined positional information corresponding to the second position.

In this manner, the correction value can be obtained based on an error (difference) between the estimated positional information and the positional information to be originally obtained (predetermined positional information). For example, the path information is corrected ex post facto by the correction value. Alternatively, the correction value is applied to the acquisition of the next path information, and the positional information corrected in the real time can be acquired.

Figure 8:
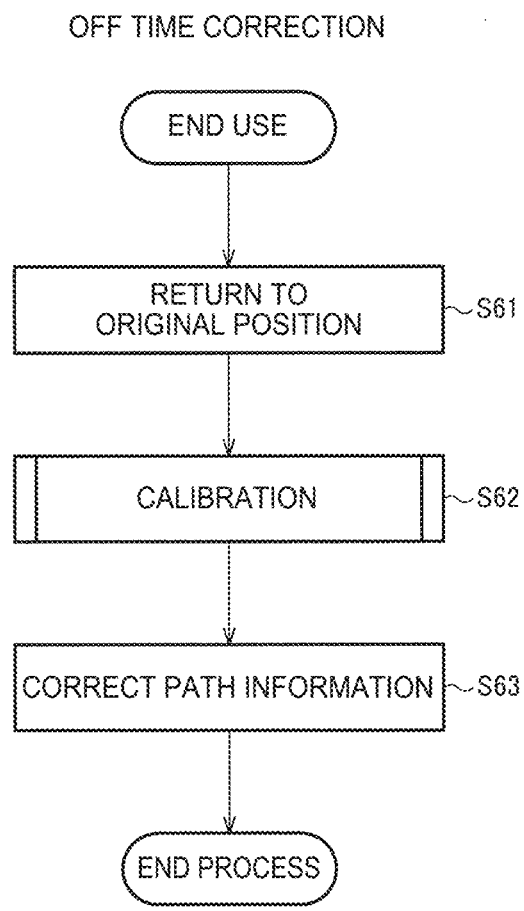
FIG. 8 is a process flow chart in a case where path information is corrected with an off time.

Here, the first position and the second position may be set in the same position, and may be the different position to each other. The positional information to be originally obtained as the positional information of at least the second position (predetermined positional information) may be obtained in advance. The movement from the first position to the second position may be an arbitrarily path. For example, as illustrated in FIG. 8 below, in a case of beginning the movement from the start point and returning to the start point again, the first position and the second position are at the same position (start point). The position estimated as the second position (estimation value of the goal point) is different from the start point (expectation value of the goal point) in some cases. The correction value is obtained from the difference. Alternatively, as described in FIG. 11 below, in a case where a calibration is performed between a plurality of reference points, a first reference point is the first position and a next second reference point is the second position. The correction value is obtained using the path information between the two points. In the next calibration, the second reference point is the first position and a next third reference point is the second position. The positional information to be originally obtained at each reference point (predetermined positional information) is stored in, for example, the storage unit 330.

The zero point correction value is a correction value for correcting a zero point drift of the gyro sensor. The zero point drift outputs an angular velocity in which the gyro sensor is not zero regardless of zero of the angular velocity at the detection axis actually. The angular velocity which is detected erroneously is referred to as a zero point offset, and the zero point correction value is a value for canceling the zero point offset. The sensitivity correction value is a correction value for correcting the detection sensitivity of the gyro sensor ((angular velocity)/(code value of the detection data)). The detection sensitivity is used when the angular velocity is converted to the angle (the rotation number). However, when there is an error between the detection sensitivity which is used for the operation and the actual detection sensitivity, there is an error between the angle which is obtained by the operation and the actual angle. The sensitivity correction value is used for correcting the error. In a case where the zero point correction or the sensitivity correction is performed inside the gyro sensors 810 and 910, the correction value which is obtained above may be used. Alternatively, in the different processing unit 300, the zero point correction or the sensitivity correction is further performed, and the positional information (path information) may be corrected.

In addition, in the present embodiment, the processing unit 300 acquires the path information that is the plurality of positional information items along the path from the first position to the second position, obtains the correction value based on the path information, and corrects the path information based on the correction value. This process corresponds to the correction of the example-post facto path information to be described later in FIGS. 8 and 11.

According to the present embodiment, the path information from the first position to the second position is obtained once, the correction value is obtained using the path information, and the path information is corrected ex post facto by the correction value. Therefore, by using the acquired path information, the correction value appropriate to the path information is obtained and the path information can be corrected. Therefore, more accurate path information can be obtained.

The correction of the path information may be performed after acquiring the all of the path information from the start pint to the goal point for example, as the process of FIG. 8. Alternatively, as a process of FIG. 11, every time the plurality of reference points provided from the start point to the goal point is passed through, the path information between the reference points may be sequentially corrected.

In addition, the detection system 600 includes a storage unit (storage units 820 and 920 or the storage unit 330) for storing the correction value. The processing unit 300 performs the estimation process of the positional information based on the correction value stored in the storage unit. The process corresponds to the acquisition of the positional information based on the correction value which is obtained beforehand to be described later in FIG. 12.

According to the present embodiment, for example, in an initialization work or the like before starting a use of the moving object, the path information from the first position to the second position is obtained, the correction value is obtained using the path information, and the correction value is stored in the storage unit. In a case of using the moving object thereafter, the positional information is acquired based on the correction value which is stored in the storage unit. Therefore, the corrected positional information (path information) can be obtained using the correction value which is obtained beforehand. Therefore, more accurate positional information (path information) can be acquired.

In addition, in the present embodiment, in a case where it is determined that the moving object is moved in the predetermined region based on the positional information, the processing unit 300 performs a process for presenting the information relating to the predetermined region. The presenting process is, for example, a process for displaying the information to the display unit 350.

For example, in the store of the retailing store, the information of the product which is displayed at a location where the customer is stopped is displayed. Alternatively, in the factory or the warehouse, contents of the work to be performed in each position by the worker are displayed. Alternatively, in the store or the factory, and the warehouse, the position where the product and the goods which are desired to the customer or the worker are placed may be displayed. Alternatively, the navigation information to the position may be displayed.

The predetermined region is a region where the information to be provided to the user of the moving object relating to the region is present. For example, in the above-mentioned example, the example corresponds to a displacement area of a product display shelf in the store or a work area in the factory or the warehouse.

According to the present embodiment, the information relating to the predetermined region is presented to the user of the moving object based on the positional information. Therefore, it is possible to provide various information items relating to the movement path according to the movement path of the user, whereby the convenience is improved.

In addition, in the present embodiment, in a case where it is determined that the predetermined number or more of moving objects are present in the predetermined region among a plurality of the moving objects each including the first sensor and the second sensor, the processing unit 300 may perform a notification process. The notification process is a process for performing a notification, for example, by lighting of a lamp or a sound, a process for displaying the notification information to the display unit 350, or the like.

For example, in the retailing store, in a case where it is determined that there are a plurality of shopping carts in an accounting place (displacement area of an accounting register), the information is notified to a staff. Alternatively, in the factory, in a case where it is determined that there is a plurality of wagons in which the products are stacked in the work area, the information that the work at the work region is delayed is notified to the worker.

The predetermined region is a region which is focused by a user operating the plurality of moving objects (for example, a manager of the store, or a manager of the factory) what the moving object is laminated or not to the region. For example, in the above example, it corresponds to the accounting place in the store or the work region in the factory.

According to the present embodiment, with respect to the user which operates the plurality of moving objects, it is notified whether the predetermined number or more of the moving objects are present in the predetermined region based on the positional information. Therefore, the various information items in accordance with the positions of the plurality of moving objects can be provided, whereby the convenience is improved.

2. Modification Example of Detection System

The configuration of the detection system 600 is not limited to FIG. 2. For example, FIG. 3 illustrates a modified configuration example of the detection system 600 and a configuration example of an information processing system. 700 including the detection system 600.

The information processing system 700 includes the detection system 600 and an information processing apparatus 400. The detection system 600 includes the first sensor unit 800 and the second sensor unit 900. The first sensor unit 800 includes the gyro sensor 810 (first sensor), the storage unit 820, the communication unit 830, and the processing unit 300 (including a CPU, in the broad sense, a processor and a processing apparatus). The second sensor unit 900 includes the gyro sensor 910 (second sensor), the storage unit 920, and the communication unit 930. The information processing apparatus 400 includes a CPU 410, a communication unit 420, a storage unit 430, an operation unit 440, and a display unit 450. Note that the same configuration elements as those described above with reference to FIG. 2 are indicated by the same reference sings, and the description thereof is appropriately omitted.

In the modified configuration example, the first sensor unit 800 includes the processing unit 300. The processing unit 300 performs the self position estimation. Specifically, the yaw rotation information of the wheel 35 detected by the gyro sensor 910 is transmitted to the communication unit 830 through the communication unit 930. The processing unit 300 estimates the positional information of the moving object based on the rotation information of the wheel 35 which is detected by the gyro sensor 810 and the yaw rotation information which is received by the communication unit 830. The communication unit 830 transmits the estimated positional information to the communication unit 420 of the information processing apparatus 400. The CPU 410 performs various processes (for example, an analysis of the path, or the like) based on the received positional information. The information processing apparatus 400 is provided outside the moving object and the path information is acquired from a plurality of detection systems 600, and the information process is performed.

Figure 3:
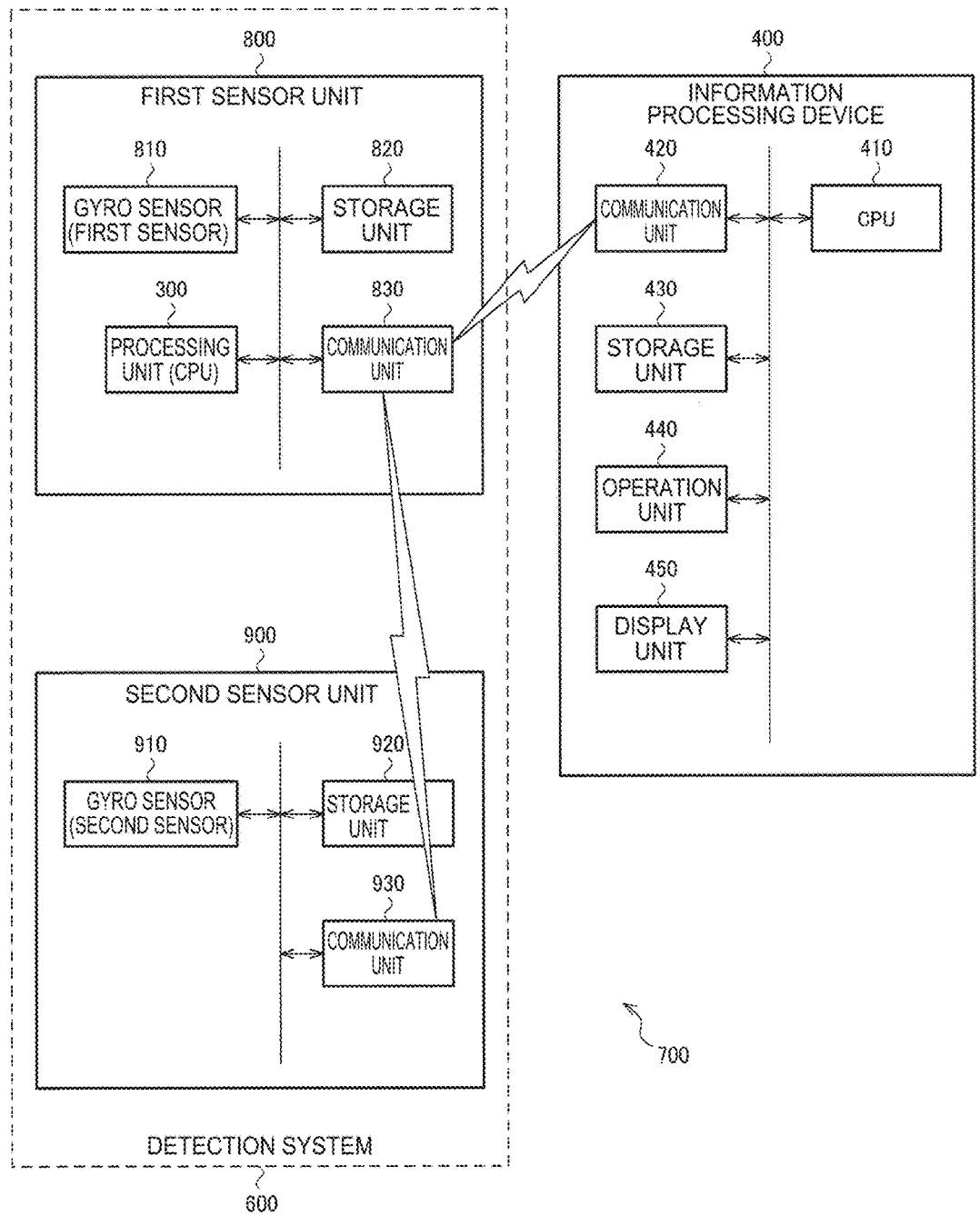
FIG. 3 illustrates configuration examples of the detection system and an information processing system.

In FIG. 3, a case where the processing unit 300 is included in the first sensor unit 800 is described. However, it is not limited thereto, for example, the processing unit 300 may be included in the second sensor unit 900.

3. Moving Object

Figure 4A:
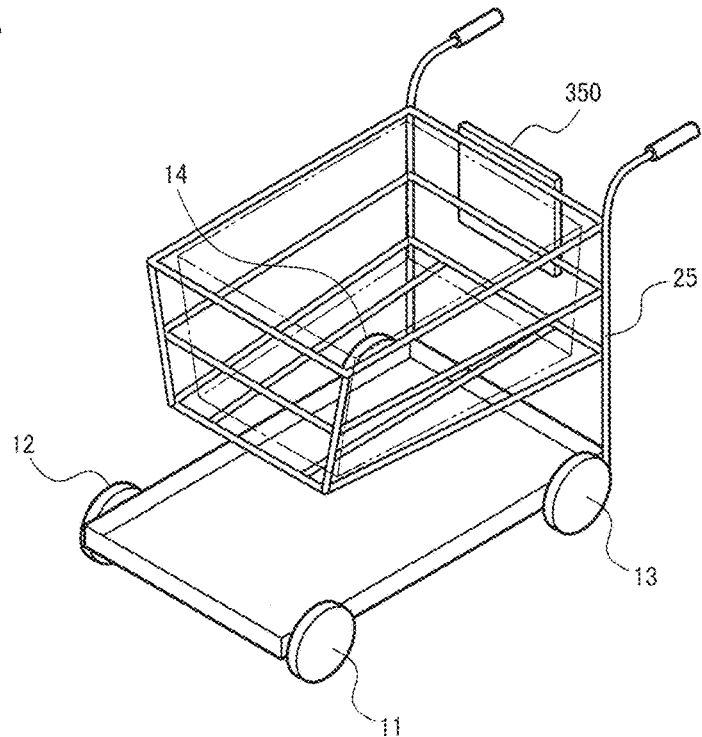
FIGS. 4A and 4B illustrate a configuration example of a moving object.
Figure 4B:
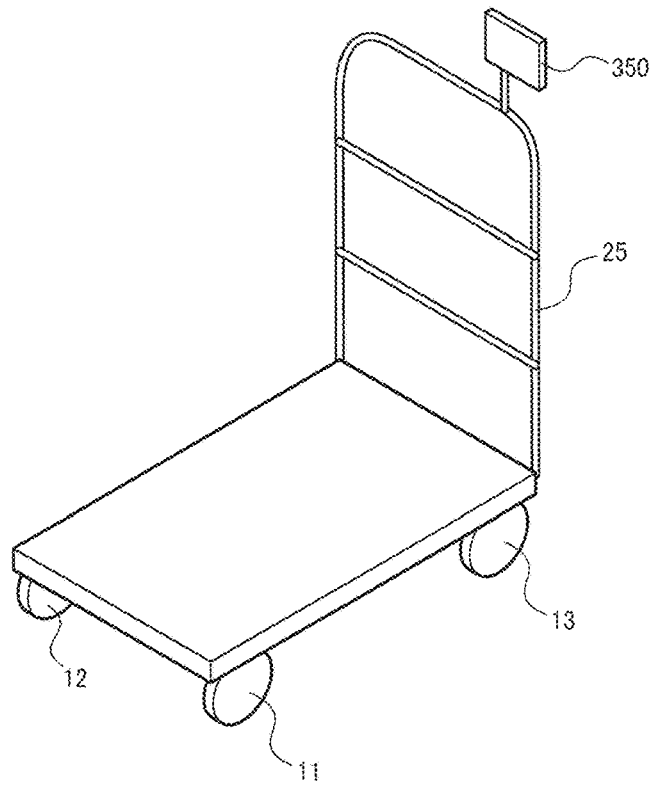

FIGS. 4A and 4B illustrate a configuration example of a moving object according to the present embodiment. FIG. 4A illustrates an example of a shopping cart and FIG. 4B illustrates an example of a wagon.

The moving object of FIGS. 4A and 4B includes four wheel portions 11 to 14 and the main body 25. Each wheel portion of the wheel portions 11 to 14 is configured by the wheel 35 and the caster unit 15. In the shopping cart of FIG. 4A, in the main body 25, for example, a wagon in which the wheel portions 11 to 14 are attached, a handle for operating the shopping cart by the user, a basket for entering the products or the like are included. In the wagon of FIG. 4B, in the main body 25, for example, a wagon on which the wheel portions 11 to 14 are attached (and stacking burdens) or the handle for operating the wagon by the user are included.

The detection apparatus 500 is attached to any one of the wheel portions 11 to 14. Alternatively, the detection apparatus 500 is attached to two or more of wheel portion of the wheel portions 11 to 14, and the position estimation of one moving object may be performed from the detection result of the plurality of detection apparatuses 500.

Only detection apparatus 500 may be mounted on the moving object and the all of the detection systems 600 may be mounted on the moving object by mounting the processing unit 300 on the moving object. In the latter case, as illustrated in FIGS. 4A and 4B, the display unit 350 for presenting the information to the user may be attached to the moving object. Alternatively, the detection apparatus 500, the communication unit and the display unit 350 are provided on the moving object and the processing unit 300 is provided outside the moving object. The operation result of the processing unit 300 is transmitted to the communication unit of the moving object and the processing result may be displayed to the display unit 350 of the moving object.

In a case where the plurality of moving objects is operated, the next configuration can be considered. In a case where the processing unit 300 is provided in the outside of the moving object, the processing unit 300 performs a communication with the detection apparatus 500 of the plurality of moving objects (that is, a plurality of detection apparatuses 500), an acquisition of the path information of each moving object or the information process using the processes is performed. Alternatively, in a case where the processing unit 300 is provided in the moving object, the information processing apparatus 400 is provided in the outside of the moving object, and the information processing apparatus 400 performs the communication with the processing unit 300 of the plurality of moving objects (that is a plurality of processing units 300), and the acquisition of the path information of each moving object or the information process using the processes is performed.

The self position estimation method of the present embodiment is not limited to the above-described moving object and can be applied to the various moving objects which are travelling by the wheel. As such a moving object, for example, an auto vehicle, a travelling robot (self-running or non-self running), a baby buggy, a trolley, a car, a bike, or the like can be assumed.

4. Operation of Detection System

Figure 5:
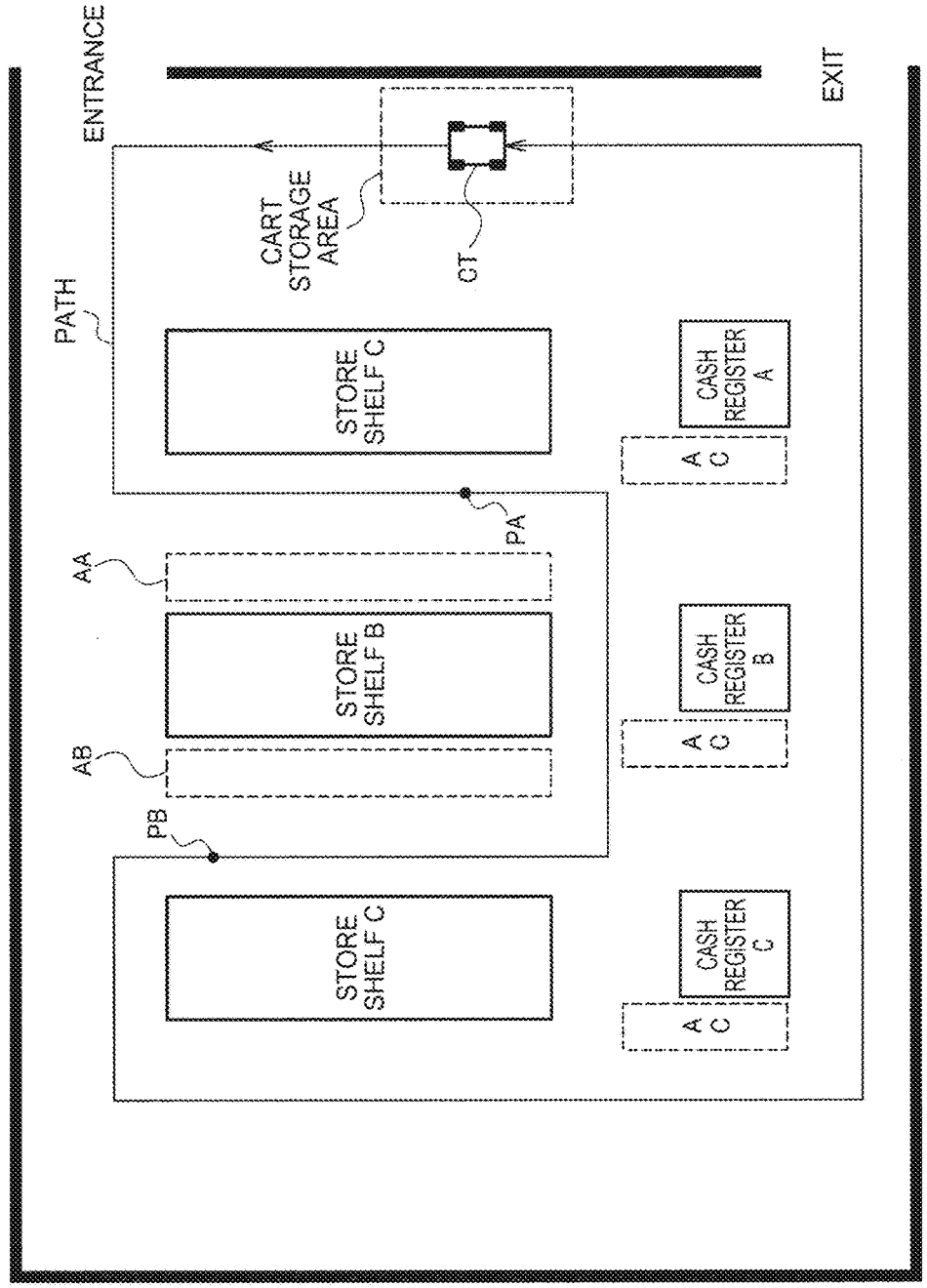
FIG. 5 is an operation explanatory diagram of the detection system in a case where a shopping cart is exemplified.

An operation of the detection system 600 according to the present embodiment will be described in detail below. FIG. 5 is an operation explanatory diagram of the detection system 600 in a case where the shopping cart is exemplified.

As illustrated in FIG. 5, a shopping cart SH is placed on a cart storage area (a start position and the predetermined position), the user extracts the shopping cart SH from the cart storage area, moves to the displacement location of store shelves A to C, passes through any one of the cash registers A to C (accounting place), and returns the shopping cart SH to the cart storage area.

For example, by performing a start operation by the user (for example, pressing the button) or performing passing through the gate of the cart storage area (the start instruction is transmitted to the detection system 600 by the communication), the detection system 600 starts the acquisition of the path information. Alternatively, by performing an end operation by the user (for example, pressing the button) or performing passing through the gate of the cart storage area (the end instruction is transmitted to the detection system 600 by the communication), the detection system 600 ends the acquisition of the path information.

The information such as a path that the user is passed through in the store, a time or velocity passing through each position of the path is obtained from the path information. For example, it is assume that a fact that the user is stopped in a position PA adjacent to the store shelve A, and a position PB adjacent to the store shelve C can be recognized from the path information. It is assumed that in the cash registers A to C, the POS data is acquired, and in the POS data, a record that the product which is displayed adjacent to the position PA of the store shelve A is remained. In this case, it can be considered that the product displayed adjacent to the position PB of the store shelve C is considered the purchase by the user but the user does not buy the product. Such analysis data cannot be obtained from only the POS data, and can be obtained by combining the position estimation of the shopping cart SH.

As the above-described predetermined region, it is assumed that regions AA and AB are set adjacent to the store shelve B. The setting information is stored in the storage unit 330 of the processing unit 300, for example. In a case where the processing unit 300 detects that the shopping cart SH is in the regions AA and AB, the processing unit 300 displays the information of the product of the store shelve B to the display unit 350. In addition, as the predetermined region, it is assumed that the region AC is set to adjacent to the cash registers A to C. In a case where the processing unit 300 detects that the predetermined number of more of shopping carts SH are present in the region AC, the processing unit 300 notifies an increase of an accountant profession to the staff.

Figure 6:
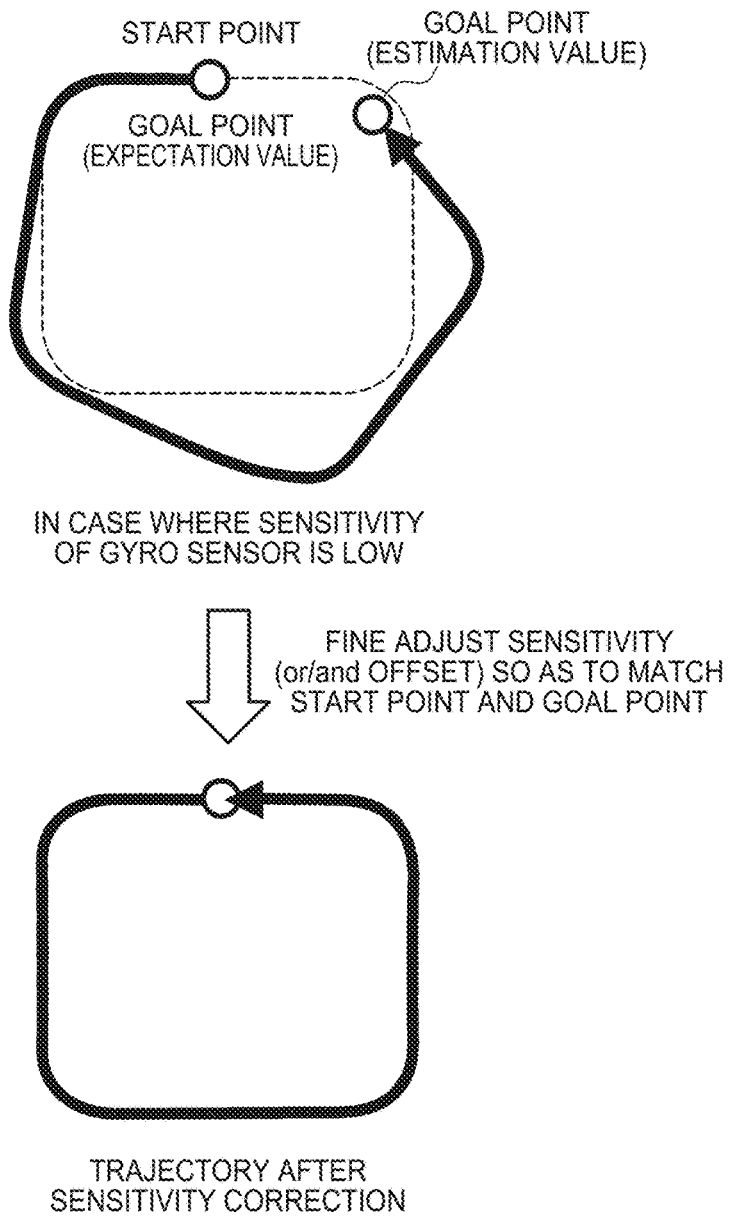
FIG. 6 is a conceptual explanatory diagram of an acquisition process and a correction process of a correction value.

An acquisition process or a correction process of the correction value will be described with reference to FIGS. 6 to 12. FIG. 6 illustrates a conceptual explanatory diagram of the acquisition process and the correction process of the correction value.

In FIG. 6, an example of a case where the start point (first position) is matched with the goal point (second position) is illustrated. For example, in a case where the sensitivity of the gyro sensor is lower than the expected sensitivity (the sensitivity to be used in the operation), the start point is not matched with the goal point in the estimated path information. In this case, the sensitivity for matching the start point and the goal point is obtained and the path information is corrected by using the sensitivity. Accordingly, the correct path information in which the start point is matched to the goal point can be obtained.

Even in a case where there is the zero point offset, since the start point is not matched with the goal point, by correcting the zero point off set, the correction to match the start point to the goal point may be performed. Any one of the sensitivity correction and the zero point correction may be performed and the both of the corrections may be performed.

Figure 7:
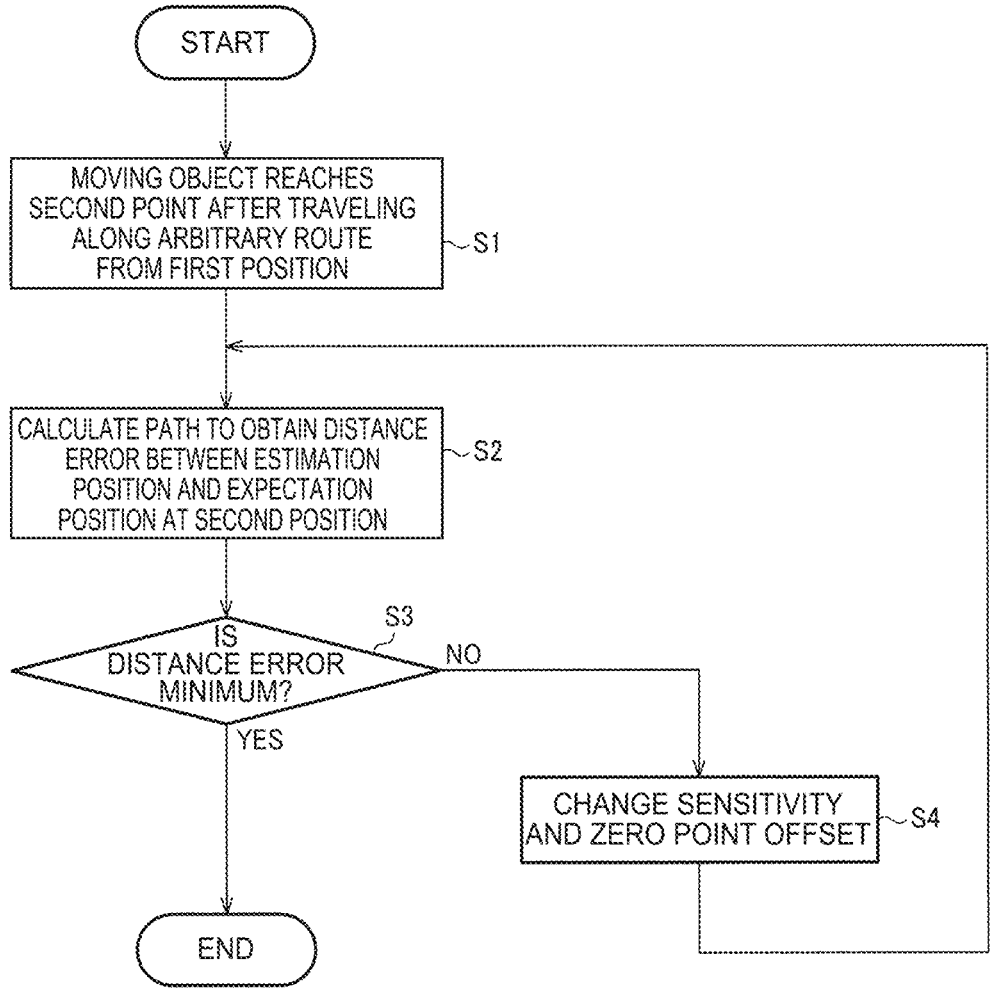
FIG. 7 is a flow chart of a calibration process.

FIG. 7 illustrates a flow chart of a calibration process. First, the moving object travels the arbitrary route from the first position. Thereafter the moving object reaches the second position (S1). In the example of FIG. 6, the first position is the start point and the second position is the goal point (start point). However, the first position may be different from the second position. Next, the path (trajectory) from the first position to the second position is calculated and a distance error (for example, a difference) between the position which is estimated as the second position and the position to be obtained as the second position (expected position) is obtained (S2). Next, it is determined whether the distance error is the minimum value (S3). In a case where it is determined that the distance error is not the minimum value, the process returns to Step S2 by chancing the sensitivity and the zero point offset (S4), and searching of the correction value is repeated until the distance error is determined to have become minimum value in Step S3.

FIG. 8 illustrates a process flow chart in a case where path information is corrected with an off time. First, after the detection system travels the arbitrary route from the start point, the moving object returns to the original start point (S61). Next, as the calibration process (S62), Steps S2 to S4 of FIG. 7 are executed and the correction value is obtained. Next, the path information is corrected by the obtained correction value (S63). That is, the path information which is used for obtaining the correction value is corrected by the obtained correction value. After the moving object is returned to the start point, that is, after all of the path information items are acquired (in off time), the correction is performed.

Figure 9:
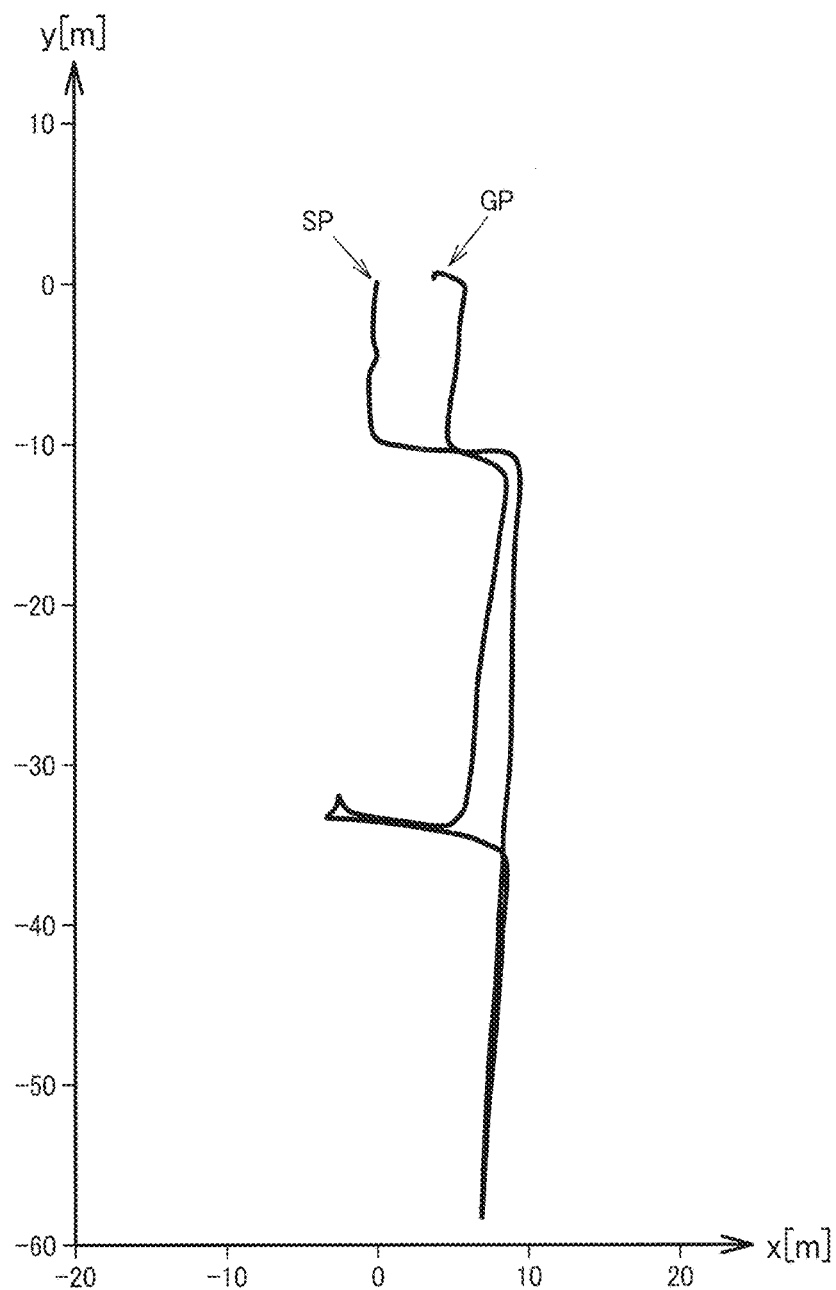
FIG. 9 illustrates an example in which an off time correction is applied to actual travelling data.
Figure 10:
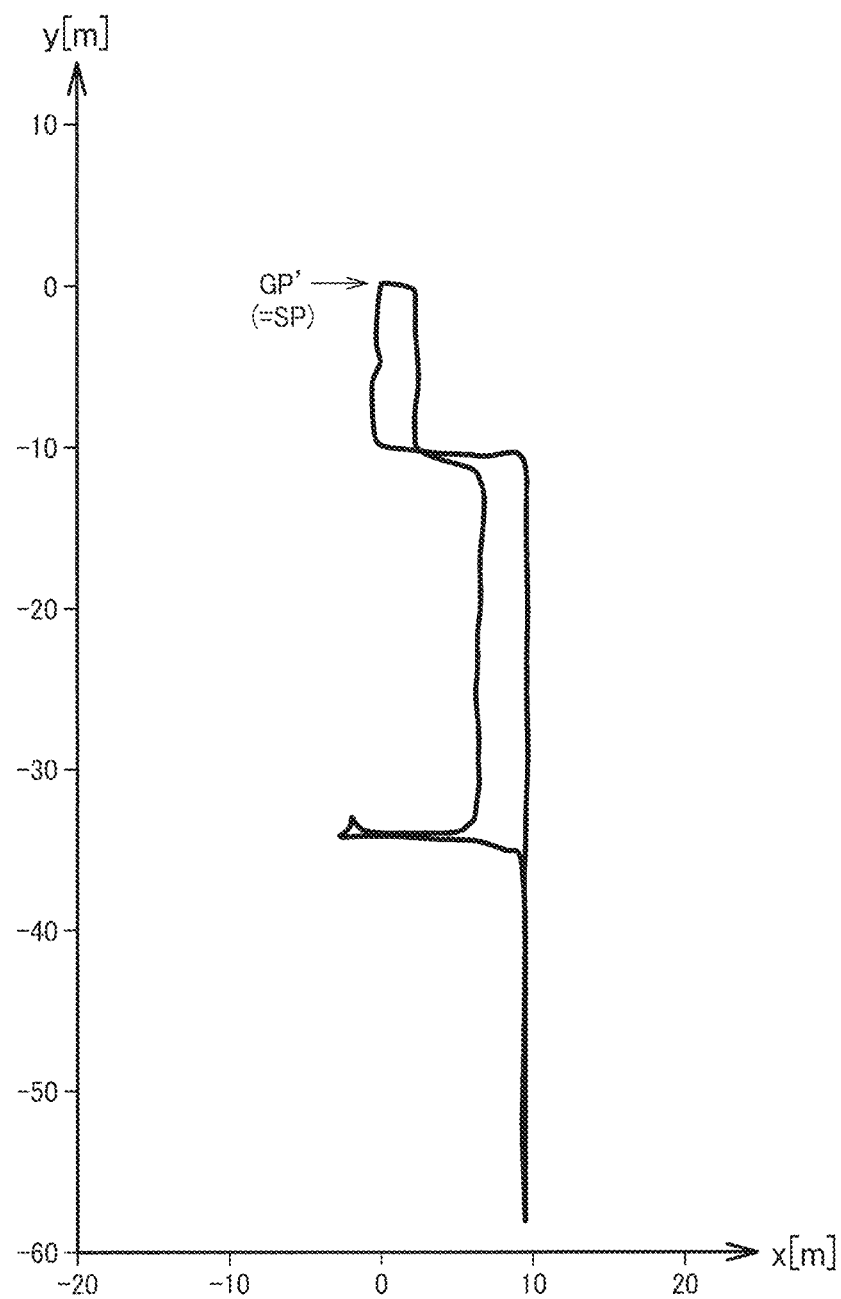
FIG. 10 illustrates an example in which the off time correction is applied to the actual travelling data.

FIGS. 9 and 10 illustrate an example in which the off time correction is applied to actual travelling data. FIG. 9 illustrates the path information before correcting and FIG. 10 illustrates the path information after correction. As illustrated in FIG. 9, a start point SP and a goal point GP in the estimated path information do not matched to each other by the sensitivity error or the zero point drift of the gyro sensor. As illustrated in FIG. 10, by correcting the path information by applying the correction process of FIG. 8, the start point SP is matched with a goal point GP' of the corrected path information and the positional information of the all of the paths is corrected, and the more accurate path information can be obtained over the all of the paths.

Figure 11:
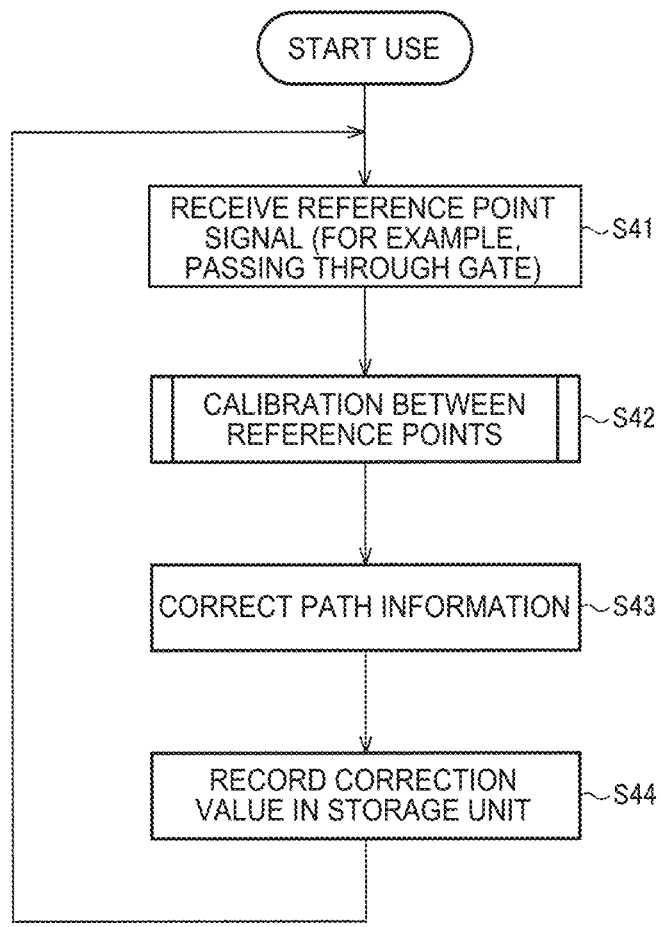
FIG. 11 is a process flow chart in a case where the path information is corrected with the on time.

FIG. 11 illustrates a process flow chart in a case where the path information is corrected with the on time. First, when passing through the reference point, a reference point signal is received from the reference point (S41). A plurality of reference points is provided in the path. The reference point is a gate, for example. When the moving object is passed through the gate, the detection system 600 is communicated with the gate, the detection system 600 receives the reference point signal, and it is detected that the reference point is passed through. Next, the calibration process (S42) is performed. That is, the reference point which has passed through in this time is set as the second position and the reference point which has passed through previously is set as the first position and Steps S2 to S4 of FIG. 7 are executed. Next, the path information between the reference point which has passed through in this time and the reference point which has passed through previously is corrected by the obtained correction value (S43). Next, the correction value is stored in the storage unit (S44) and the process returns to Step S41. The path information until the next reference point is estimated by using the correction value which is stored in Step S44. For example, the correction value is stored in the storage units 820 and the 920 of the detection apparatus 500, the gyro sensors 810 and 910 output the angular velocity information or the angular information based on the correction value, and the processing unit 300 may acquire the positional information by using these information items. Alternatively, the correction value is stored in the storage unit 330 of the processing unit 300, the angular velocity information or the angular information from the gyro sensors 810 and 910 is corrected by the correction value, and the positional information may be acquired by using the corrected information. The correction process is performed when each reference point is passed through while the moving object is traveling the path (in on time).

Figure 12:
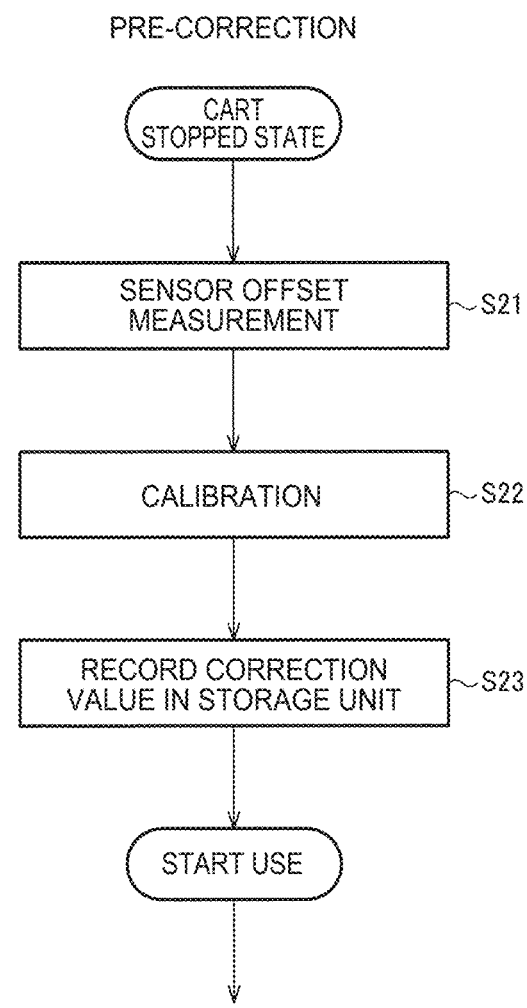
FIG. 12 is a process flow chart in a case where the correction value is obtained beforehand.

FIG. 12 illustrates a process flow chart in a case where the correction value is obtained beforehand. First, in a stop state of the cart, the zero point offset is measured from the outputs of the gyro sensors 810 and 910 (S21). Next, the calibration process for obtaining the zero point correction value for correcting the measured zero point offset is performed (S22). Next, the obtained zero point correction value is stored in the storage unit (S23). For example, the correction value is stored in the storage units 820 and the 920 of the detection apparatus 500, the gyro sensors 810 and 910 output the angular velocity information or the angular information based on the correction value, and the processing unit 300 may acquire the positional information by using these information items. Alternatively, the correction value is stored in the storage unit 330 of the processing unit 300, the angular velocity information or the angular information from the gyro sensors 810 and 910 is corrected by the correction value, and the positional information may be acquired by using the corrected information. The process is performed before providing the moving object to actual use, and the correction value which is acquired by the process is used when the position estimation is performed in the actual use of the moving object.

5. Detailed Configuration of Gyro Sensor

Figure 13:
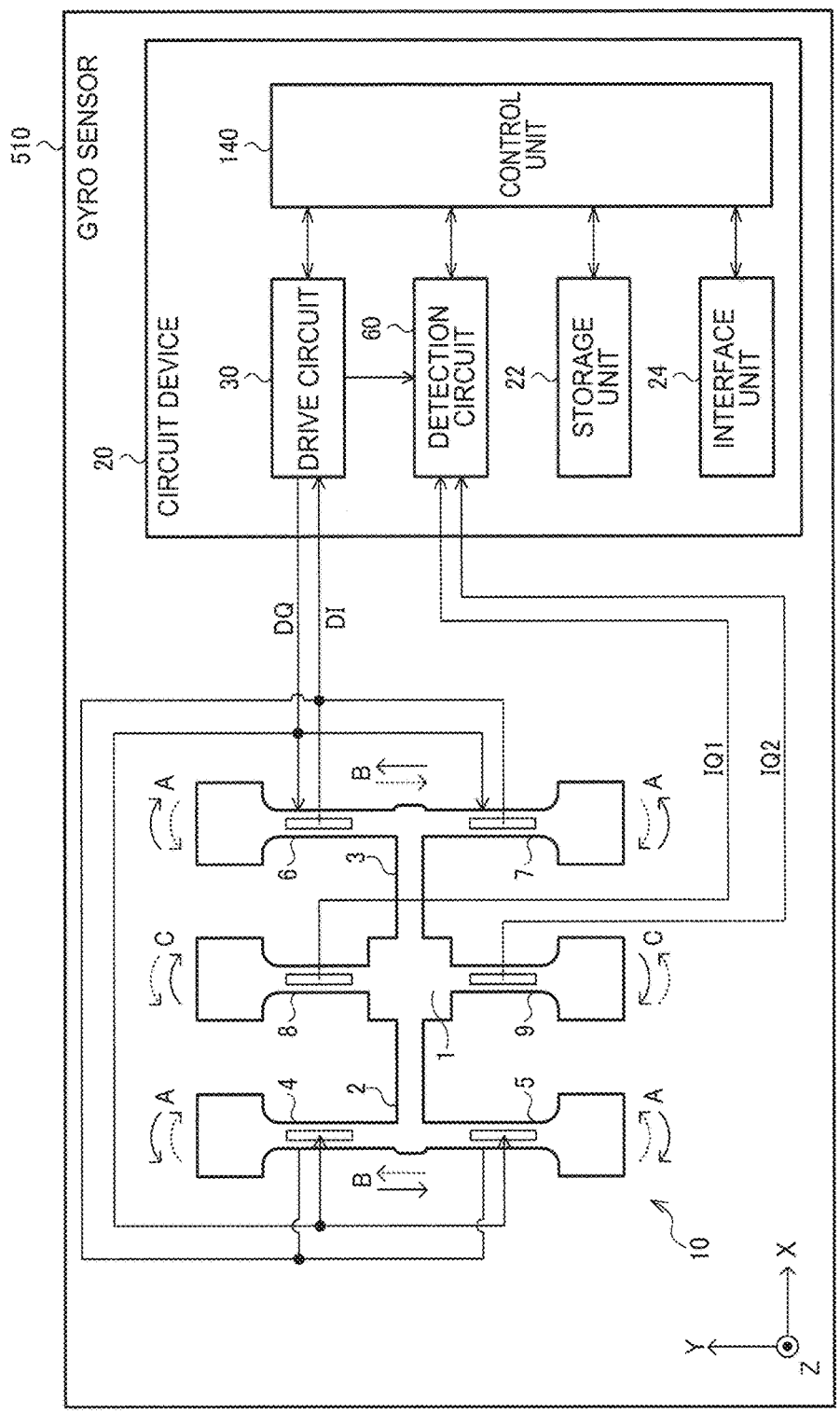
FIG. 13 illustrates a detailed configuration example of a gyro sensor.

FIG. 13 illustrates a detailed configuration example of a gyro sensor 510 according to the present embodiment.

The gyro sensor 510 is not limited to the configuration of FIG. 13 and various modification embodiments such that a part of the configuration element can be omitted or the other configuration element is added. In addition, hereinafter, a physical quantity transducer (angular velocity element) is a piezoelectric vibrating reed (the vibrating gyro). A case where the sensor is the gyro sensor is described as an example. However, the invention is not limited thereto. For example, the invention can also be applied to an electrostatic capacitance detection type vibrating gyro which is formed by a silicon substrate or the physical quantity transducer for detecting the physical quantity equivalent to the angular velocity information.

The gyro sensor 510 (physical quantity detection apparatus) includes a vibrating reed 10 and a circuit device 20. The vibrating reed 10 (in the broad sense, the physical quantity transducer and the angular velocity sensor element) is a piezoelectric vibrating reed which is formed of a piezoelectric material thin plate such as a crystal. Specifically, the vibrating reed 10 is a double T type vibrating reed which is formed by a Z-cut crystal substrate.

The circuit device 20 includes a drive circuit 30, a detection circuit 60, a storage unit 22, an interface unit 24, and the control unit 140. Various modification embodiments such that a part of the configuration element can be omitted or the other configuration element is added.

The storage unit 22 is, for example, a register or a RAM, a non-volatility memory, or the like, and stores setting information of the circuit device 20 or various parameters or the like which is used for detecting of the physical quantity. The storage unit 22 may be used as the storage unit 820 or the storage unit 920 of the detection apparatus 500.

The interface unit 24 is used for communicating the control signal or data between the circuit device 20 and the external circuit device (for example, the communication units 830 and 230 and the storage units 820 and 920 of FIG. 2, and the processing unit 300 (CPU) or the like of FIG. 3).

The drive circuit 30 is configured to output a drive signal DQ to drive the vibrating reed 10. For example, by receiving a feedback signal DI form the vibrating reed 10 and output a corresponding the drive signal DQ, the vibrating reed 10 is vibrated. The detection circuit 60 receives detection signals IQ1 and IQ2 (a detection current and a charge) from the vibrating reed 10 driven by the drive signal DQ to detect (extract) a desired signal (Coriolis force signal) in accordance with the physical quantity applied to the vibrating reed 10 from the detection signals IQ1 and IQ2.

The vibrating reed 10 includes a base portion 1, connecting arms 2 and 3, drive arms 4, 5, 6, and 7, and detecting arms 8 and 9. The detecting arms 8 and 9 are extended in a +Y-axis direction and a −Y-axis direction with respect to the rectangular-shaped base portion 1. In addition, the connecting arms 2 and 3 are extended in −X-axis direction and +X-axis direction with respect to the base portion 1. The drive arms 4 and 5 are extended in a +Y-axis direction and −Y-axis direction with respect to the connecting arm 2. The drive arms 6 and 7 are extended in the +Y-axis direction and the −Y-axis direction with respect to the connecting arm 3.

The drive signal DQ from the drive circuit 30 is input to drive electrodes which are provided in top surfaces of the drive arms 4 and 5 and drive electrodes which are provided in side surfaces of the drive arms 6 and 7. In addition, signals from drive electrodes which are provided in side surfaces of the drive arms 4 and 5 and drive electrodes which are provided in top surfaces of the drive arms 6 and 7 are input to the drive circuit 30 as the feedback signal DI. In addition, signals from detection electrodes which are provided on top surfaces of the detecting arms 8 and 9 are input to the detection circuit 60 as the detection signals IQ1 and IQ2. Common electrodes which are provided in side surfaces of the detecting arms 8 and 9 are, for example, grounded.

When the alternating drive signal DQ is applied by the drive circuit 30, the drive arms 4, 5, 6, and 7 perform bending vibration (excitation vibration) as illustrated in an arrow A by an inverse piezoelectric effect. That is, tip ends of the drive arms 4 and 6 repeat approaching to each other and separating from each other, and tip ends of the drive arms 6 and 7, 5 and 7 perform the bending vibration repeating the approaching and separation. In this time, since the drive arms 4 and 5, and the drive arms 6 and 7 perform line-symmetric vibration with respect to the Y-axis passing through the center of gravity position of the base portion 1, the base portion 1, the connecting arms 2 and 3, and the detecting arms 8 and 9 hardly vibrate.

In this state, when the angular velocity in which the Z axis is set as the rotation axis with respect to the vibrating reed 10 is applied (when the vibrating reed 10 is rotated about the Z axis), the drive arms 4, 5, 6, and 7 are vibrated by the Colriolis force as illustrated by an arrow B. That is, a vibration component in a direction of the arrow B is generated by moving the drive arms 4, 5, 6, and 7 by the Colriolis force in a direction of the arrow B orthogonal to the direction of the arrow A and the direction of the Z axis. The vibration of the arrow B is transmitted to the base portion 1 through the connecting arms 2 and 3 and the detecting arm 8 and 9 perform the bending vibration in a direction of the arrow C. The charge signal created by the piezoelectric effect by the bending vibration of the detecting arms 8 and 9 is input to the detection circuit 60 as the detection signals IQ1 and IQ2. Here, the vibrations of the arrow B of the drive arms 4, 5, 6, and 7 are vibrations in a circumferential direction with respect to the center of gravity position of the base portion 1. The vibrations of the detecting arms 8 and 9 are vibrations in a direction of the arrow C in an inverse direction of the arrow B in the circumferential direction. The detection signals IQ1 and IQ2 are signals in which the phase with respect to the drive signal DQ is shifted by 90 degrees.

For example, when the angular velocity of the vibrating reed 10 (gyro sensor) rotating around the Z axis is defined as ω, a mass is defined as m, and a vibration velocity is defined as v, the Coriolis force is expressed by Fc=2m·v·ω. Accordingly, the detection circuit 60 detects the desired signal that is a signal in accordance with the Coriolis force, thereby the angular velocity ω can be obtained. By using the obtained angular velocity ω, it is possible to perform the various processes for shaking correction, attitude control, or GPS autonomous navigation.

In FIG. 13, an example of a case where the vibrating reed 10 is a double T-shaped vibrating reed is shown. However, the vibrating reed 10 according to the present embodiment is not limited to such a configuration. Therefore, the vibrating reed 10 may be a tuning fork type vibrating reed, a H-type vibrating reed, or the like. In addition, the piezoelectric material of the vibrating reed 10 may be a material such as a ceramic, or a silicon other than the quartz.

Figure 14:
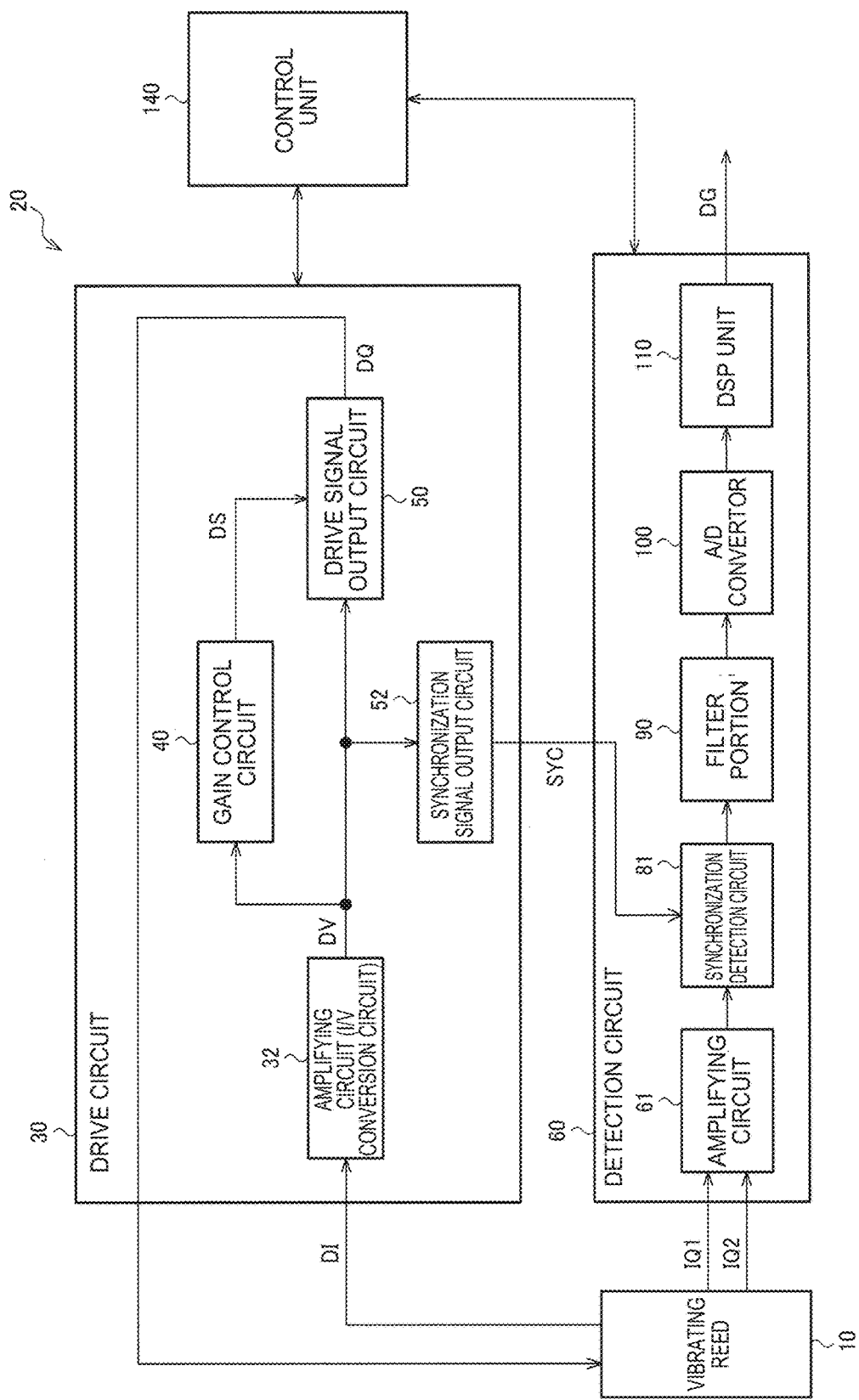
FIG. 14 illustrates detailed configuration examples of a drive circuit and a detection circuit of a circuit device.

FIG. 14 illustrates detailed configuration examples of a drive circuit 30 and a detection circuit 60 of the circuit device.

The drive circuit 30 includes an amplifying circuit 32 in which the feedback signal DI is input from the vibrating reed 10, a gain control circuit 40 for performing a self gain control, and a drive signal output circuit 50 for output the derive signal DQ to the vibrating reed 10. In addition, the drive circuit 30 includes a synchronization signal output circuit 52 for output a synchronized signal SYC to the detection circuit 60. The configuration of the drive circuit 30 is not limited to the configuration of FIG. 14 and various modification embodiments such that apart of the configuration element can be omitted or the other configuration element is added may be implemented.

The amplifying circuit 32 (I/V conversion circuit) is configured to amplify the feedback signal DI from the vibrating reed 10. For example, the current signal DI from the vibrating reed 10 is converted to the voltage signal DV and outputs the converted signal. The amplifying circuit 32 can be implemented by an operational amplifier, a feedback resistance element, a feedback capacitor, or the like.

The drive signal output circuit 50 output the drive signal DQ based on the signal DV after amplifying by the amplifying circuit 32. For example, in a case where the drive signal output circuit 50 outputs the rectangular wave (or sinusoidal wave) drive signal, the drive signal output circuit 50 can be implemented by a comparator or the like.

The gain control circuit 40 (AGC) outputs a control voltage DS to the drive signal output circuit 50 and controls the amplifying of the drive signal DQ. Specifically, the gain control circuit 40 monitors the signal DV and controls the gain of the oscillation loop. For example, in the drive circuit 30, for maintaining the sensitivity of the gyro sensor constantly, it is necessary to maintain the amplitude of the drive voltage to be supplied to the vibrating reed 10 (the drive vibrating reed) constantly. Therefore, the gain control circuit 40 for self-adjusting the gain is provided in the drive vibrating type oscillation loop. The gain control circuit 40 performs the self-adjusting of the gain variably so as to maintain the amplitude (vibrating velocity v of the vibrating reed) of the feedback signal DI from the vibrating reed 10 constantly. The gain control circuit 40 is implemented by a full-wave rectifier for full-wave rectification of the output signal DV of the amplifying circuit 32 or an integrator for performing an integration process of the output signal of the full-wave rectifier.

The synchronization signal output circuit 52 receives the signal DV after amplifying by the amplifying circuit 32 to output the synchronized signal SYC (reference signal) to the detection circuit 60. The synchronization signal output circuit 52 can be implemented by a comparator which creates a rectangular synchronized signal SYC by performing a binarizing process of a signal DV of a sine wave (alternating current) or a phase adjustment circuit (phase shifter) which performs a phase adjustment of the synchronized signal SYC.

The detection circuit 60 includes an amplifying circuit 61, a synchronization detection circuit 81, a filter portion 90, an A/D convertor 100, and a DSP unit 110. The amplifying circuit 61 receives first and second detection signals IQ1 and IQ2 from the vibrating reed 10 to perform a charge-voltage conversion, a differential signal amplification, a gain adjustment, or the like. The synchronization detection circuit 81 performs the synchronous detection based on the synchronized signal SYC from the drive circuit 30. The filter portion 90 (low pass filter) serves as a pre-filter of the A/D convertor 100. In addition, the filter portion 90 serves as a circuit attenuating a unnecessary signal that cannot be removed by the synchronous detection. The A/D convertor 100 performs an A/D conversion of the signals after the synchronous detection. The DSP unit 110 performs a digital filter process with respect to the digital signal from the A/D convertor 100 or the digital signal process such as a digital correction process. An example of the digital correction process includes the zero point correction process or the sensitivity correction process.

The control unit 140 performs the control process of the circuit device 20. The control unit 140 can be implemented by a logic circuit (gate array or the like), a processor, or the like. Each switch controlling, mode setting, or the like in the circuit device 20 is performed by the control unit 140.

Although description has been given specifically of the embodiment, it is easy for a person skilled in the art to understand that various modifications are possible without departing substantially from the new matters and effects of the invention. Therefore, such modification examples are to fall under the scope of the invention. For example, any terms used at least once together with different terms of broader or synonymous sense in the specification or drawings can be replaced with such different terms in any portions of the specification and drawings. In addition, even when the present embodiment and the modification example are combined, the combination is to fall under the scope of the invention. In addition, the configurations and operations of the gyro sensor, the sensor unit, the processing unit, the detection apparatus, the detection system, the information processing system, and the moving object are not limited to those described in the present embodiment, and they may be variously implemented.

The entire disclosure of Japanese Patent Application No. 2015-215504, filed Nov. 2, 2015 is expressly incorporated by reference herein.

What is claimed is:

1. A detection apparatus for a cart comprising:
a first gyro sensor that is disposed directly on a wheel of the cart and that is configured to detect rotation angular velocity of the wheel as rotation of the wheel;
a second gyro sensor that is disposed directly on a plate extending from a caster for the wheel and that is configured to detect angular velocity in a yaw direction around a vertical axis of the wheel as a yaw rotation, the vertical axis being perpendicular to a rotation axis of the wheel, the caster being directly attached to a bottom surface of a main body of the cart, the plate extending in a direction perpendicular to the vertical axis and the rotation axis; and
a memory that is configured to store computer-readable instructions, the detected rotation of the wheel, and the detected yaw rotation of the wheel, the computer-readable instructions being executable by a processor so as to obtain a position of the cart by using the detected rotation of the wheel and the detected yaw rotation of the wheel,
wherein positions of the first and second gyro sensors are laterally shifted from the vertical axis of the wheel in a plan view.

2. The detection apparatus according to claim 1, wherein the first gyro sensor is disposed directly on a side of the wheel.

3. The detection apparatus according to claim 1, wherein the wheel rotates by 360 degrees around the vertical axis in the yaw direction.

4. The detection apparatus according to claim 1, wherein the cart is a non-self-running-moving cart.

5. A detection apparatus for a cart comprising:
A first gyro sensor that is disposed directly on a wheel of the cart and that is configured to detect rotation angular velocity of the wheel as rotation of the wheel;
a second gyro sensor that is disposed directly on a plate extending from a caster for the wheel and that is configured to detect angular velocity in a yaw direction around a vertical axis of the wheel as a yaw rotation, the vertical axis being perpendicular to a rotation axis of the wheel, the caster being directly attached to a bottom surface of a main body of the cart, the plate extending in a direction perpendicular to the vertical axis and the rotation axis;
a memory that is configured to store computer-readable instructions, the detected rotation of the wheel, and the detected yaw rotation of the wheel, the computer-readable instructions being executable by a processor so as to obtain a position of the cart by using the detected rotation of the wheel and the detected yaw rotation of the wheel; and
a communication unit that is configured to transmit information relating to the detected rotation of the wheel and the detected yaw rotation of the wheel to the processor,
wherein position of the first and second gyro sensors are lateral shifted from the vertical axis of the wheel in a plan view.

6. A detection system for a cart comprising:
A first gyro sensor that is disposed directly on a wheel of the cart and that is configured to detect rotation angular velocity of the wheel as rotation of the wheel;
a second gyro sensor that is disposed directly on a plate extending from a caster for the wheel and that is configured to detect angular velocity in a yaw direction around a vertical axis of the wheel as a yaw rotation, the vertical axis being perpendicular to a rotation axis of the wheel, the caster being directly attached to a bottom surface of a main body of the cart, the plate extending in a direction perpendicular to the vertical axis and the rotation axis;
a memory that is configured to store compute-readable instructions, the detected rotation of the wheel, and the detected yaw rotation of the wheel; and
a processor that is configured to execute the computer-readable instructions so as to obtain a position of the cart by using the detected rotation of the wheel and the detected yaw rotation of the wheel,
wherein positions of the first and second gyro sensors are laterally shifted from the vertical axis of the wheel in a plan view.

7. The detection system according to claim 6, wherein the processor is further configured to:
obtain a moving distance of the wheel according to an integrated rotation angle value that is obtained by integrating the rotation angular velocity of the wheel;
obtain a moving direction of the wheel according to an integrated rotation angle that is obtained by integrating the angular velocity in the yaw direction of the wheel; and
estimate the position of the cart based on the moving distance and the moving direction.

8. The detection system according to claim 6, wherein when the cart moves from a first position to a second position, the processor is further configured to obtain one of a zero point correction value that is configured to cancel a zero point offset of the first gyro sensor and a sensitivity correction value that is configured to correct a detection sensitivity of the first gyro sensor based on a difference between current positional information of the second position and reference positional information corresponding to the second position, and the reference positional information is configured to be stored in the memory in advance.

9. The detection system according to claim 8, wherein the memory is configured to store the zero point correction value and the sensitivity correction value.

10. The detection system according to claim 6, wherein when the processor determines that the cart reaches a predetermined region, the processor is configured to provide information relating to the predetermined region, and the information relating to the predetermined region is provided to a user of the cart.

11. The detection system according to claim 6, wherein the cart is configured with a plurality of the carts, and each of the plurality of the carts has the first gyro sensor and the second gyro sensor, when the processor determines that an actual number of the plurality of the carts exceeds a predetermined number in a predetermined region, the processor is configured to perform notification such that the actual number of the plurality of the carts is in the predetermined region, and the predetermined number of the plurality of the carts is set by a user operating the plurality of the carts to any number.

12. A cart comprising:
a wheel rotating around a rotation axis;
a caster that is configured to support the wheel, the caster being directly attached to a bottom surface of a main body of the cart;
a first gyro sensor that is disposed directly on the wheel and that is configured to detect rotation angular velocity of the wheel as rotation of the wheel;
a second gyro sensor that is disposed directly on a plate extending from the caster for the wheel and that is configured to detect angular velocity in a yaw direction around a vertical axis of the wheel as a yaw rotation, the vertical axis being perpendicular to the rotation axis of the wheel, the plate extending in a direction perpendicular to the vertical axis and the rotation axis;
a memory that is configured to store computer-readable instructions, the detected rotation of the wheel, and the detected yaw rotation of the wheel; and
a processor that is configured to execute the computer-readable instructions so as to obtain a position of the cart by using the detected rotation of the wheel and the detected yaw rotation of the wheel,
wherein positions of the first and second gyro sensors are laterally shifted from the vertical axis of the wheel in plan view.

13. The cart according the claim 12, wherein the first gyro sensor is disposed directly on a side of the wheel.

14. The cart according to claim 12, wherein the wheel rotates by 360 degrees around the vertical axis in the yaw direction.

15. The cart according to claim 12, further comprising:
a communication unit that is configured to transmit information relating to the detected rotation of the wheel and the detected yaw rotation of the wheel to the processor.

16. The cart according to claim 12, wherein the processor is further configured to:
obtain a moving distance of the wheel according to an integrated rotation angle value that is obtained by integrating the rotation angular velocity of the wheel;
obtain a moving direction of the wheel according to an integrated rotation angle that is obtained by integrating the angular velocity in the yaw direction of the wheel; and
estimate the position of the cart based on the moving distance and the moving direction.

17. The cart according to claim 12, wherein when the cart moves from a first position to a second position, the processor is further configured to obtain one of a zero point correction value that is configured to cancel a zero point offset of the first gyro sensor and a sensitivity correction value that is configured to correct a detection sensitivity of the first gyro sensor based on a difference between current positional information of the second position and reference positional information corresponding to the second position, and the reference positional information is configured to be stored in the memory in advance.

\* \* \* \* \*